United States Patent
Kawamae et al.

(10) Patent No.: US 12,056,417 B2
(45) Date of Patent: Aug. 6, 2024

(54) PORTABLE TERMINAL, HEAD MOUNTED DISPLAY, AND COOPERATIVE DISPLAY SYSTEM THAT CONNECTS THE PORTABLE TERMINAL AND THE HEAD MOUNTED DISPLAY TO DISPLAY INFORMATION BY COOPERATION BETWEEN THE PORTABLE TERMINAL AND THE HEAD MOUNTED DISPLAY

(71) Applicant: Maxell, Ltd., Kyoto (JP)

(72) Inventors: Osamu Kawamae, Kyoto (JP); Shigeyuki Itou, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/030,615

(22) PCT Filed: Oct. 9, 2020

(86) PCT No.: PCT/JP2020/038271
§ 371 (c)(1),
(2) Date: Apr. 6, 2023

(87) PCT Pub. No.: WO2022/074815
PCT Pub. Date: Apr. 14, 2022

(65) Prior Publication Data
US 2023/0367536 A1    Nov. 16, 2023

(51) Int. Cl.
*G06F 3/14* (2006.01)
*G06F 3/01* (2006.01)
(Continued)

(52) U.S. Cl.
CPC ............ *G06F 3/1454* (2013.01); *G06F 3/013* (2013.01); *G06F 3/0346* (2013.01);
(Continued)

(58) Field of Classification Search
CPC ...... G06F 3/1454; G06F 3/013; G06F 3/0346; G06F 3/0488; G06F 3/04886;
(Continued)

(56) References Cited

U.S. PATENT DOCUMENTS 6,304,234 B1 * 10/2001 Horiuchi ................. G06F 3/011
345/1.3
9,946,504 B2 * 4/2018 Fuchikami .............. G06F 3/017
(Continued)

FOREIGN PATENT DOCUMENTS

JP    2005-346609 A    12/2005
JP    2012-002568 A    1/2012
(Continued)

OTHER PUBLICATIONS

International Search Report of PCT/JP2020/038271 dated Dec. 28, 2020.

*Primary Examiner* — Rodney Amadiz
(74) *Attorney, Agent, or Firm* — Mattingly & Malur, PC

(57) ABSTRACT

In a cooperative display system that connects a portable terminal and a head mounted display to display information in cooperation, the portable terminal displays information on a first display, and transmits at least a part of the information that is displayed to the head mounted display, and the head mounted display shares and displays the information transmitted from the portable terminal on a second display. Here, the information displayed on the portable terminal is hierarchical information, and the information displayed on the head mounted display is lower-level information in the hierarchical information. In addition, whether a user is stationary or moving is detected by a sensor of the portable terminal, and in a case where the user is stationary, the
(Continued)

display of the information on the portable terminal is stopped, and the information is displayed only on the head mounted display.

14 Claims, 21 Drawing Sheets

(51) Int. Cl.
*G06F 3/0346* (2013.01)
*G06F 3/0488* (2022.01)
*G06T 7/70* (2017.01)

(52) U.S. Cl.
CPC .............. *G06F 3/0488* (2013.01); *G06T 7/70* (2017.01); *G06T 2200/24* (2013.01); *G06T 2207/30201* (2013.01)

(58) Field of Classification Search
CPC .......... G06F 3/011; G06F 3/012; G06F 13/00; G06T 7/70; G06T 2200/24; G06T 2207/30201; G02B 27/017
See application file for complete search history.

(56) References Cited

U.S. PATENT DOCUMENTS

| | | |
|---|---|---|
| 2013/0002701 A1 | 1/2013 | Ida |
| 2013/0006529 A1 | 1/2013 | Miyamoto |
| 2015/0301595 A1 | 10/2015 | Miki |
| 2016/0027216 A1* | 1/2016 | da Veiga ................ G06F 3/013 345/158 |

FOREIGN PATENT DOCUMENTS

| | | |
|---|---|---|
| JP | 2012-044429 A | 3/2012 |
| JP | 2014-086063 A | 5/2014 |
| JP | 2014-153889 A | 8/2014 |
| WO | 2017/138153 A1 | 8/2017 |
| WO | 2020/003361 A1 | 1/2020 |

* cited by examiner

F I G. 3
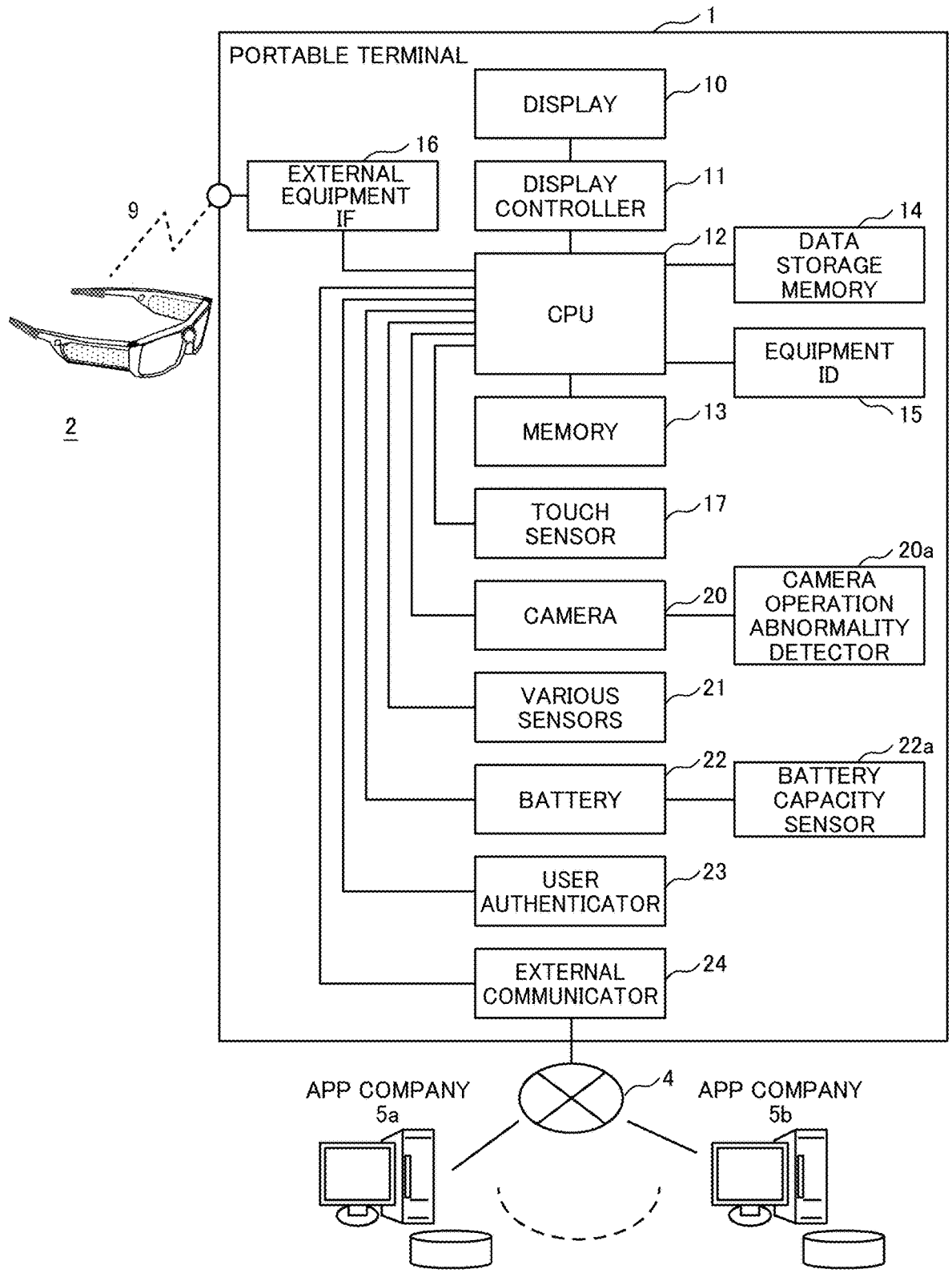

F I G. 4
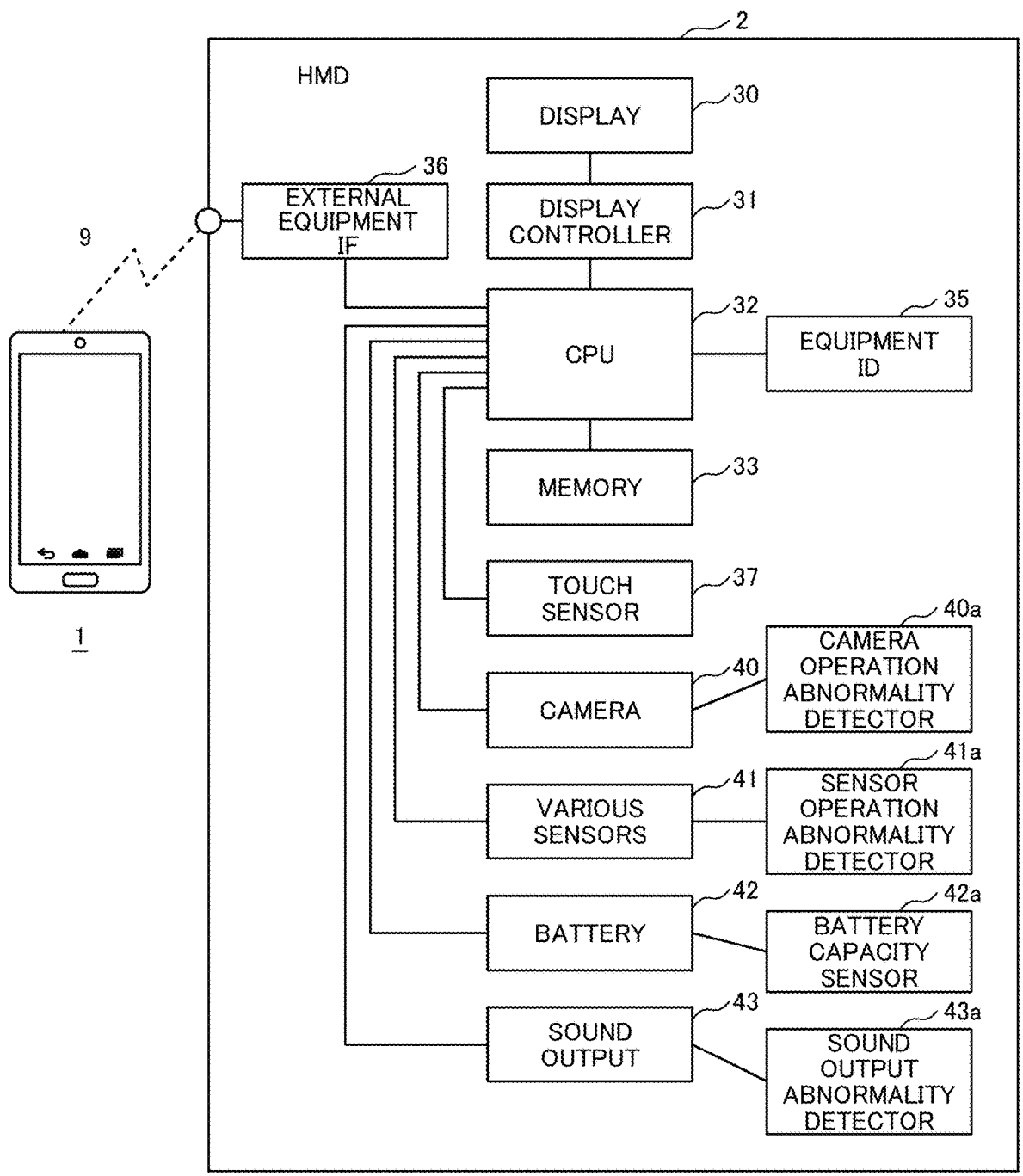

FIG. 5

| (a) PORTABLE TERMINAL → HMD | (b) HMD → PORTABLE TERMINAL |
|---|---|
| UNIQUE ID OF PORTABLE TERMINAL 1 | UNIQUE ID OF HMD 2 |
| IMAGE DATA FOR DISPLAYING INFORMATION | IMAGE DATA OF CAMERA 40 |
| IMAGE DATA FOR DISPLAYING AR | DETECTION DATA OF VARIOUS SENSORS 41 (DISTANCE, POSITION, ACCELERATION, BATTERY CAPACITY, AND OTHERS) |
| RESPONSE TO HMD OPERATION | OPERATION INPUT DATA (TOUCH OPERATION, GESTURE, AND SOUND) |

FIG. 6

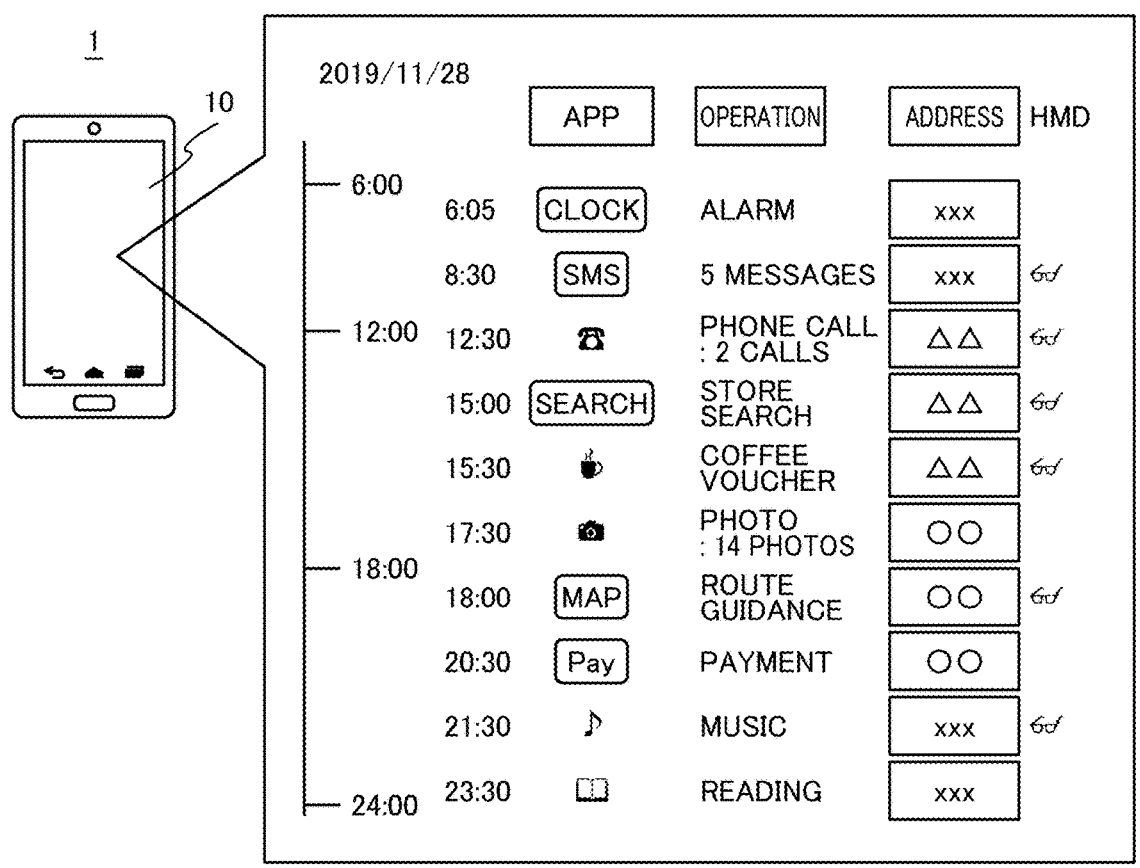

FIG. 9
(a)
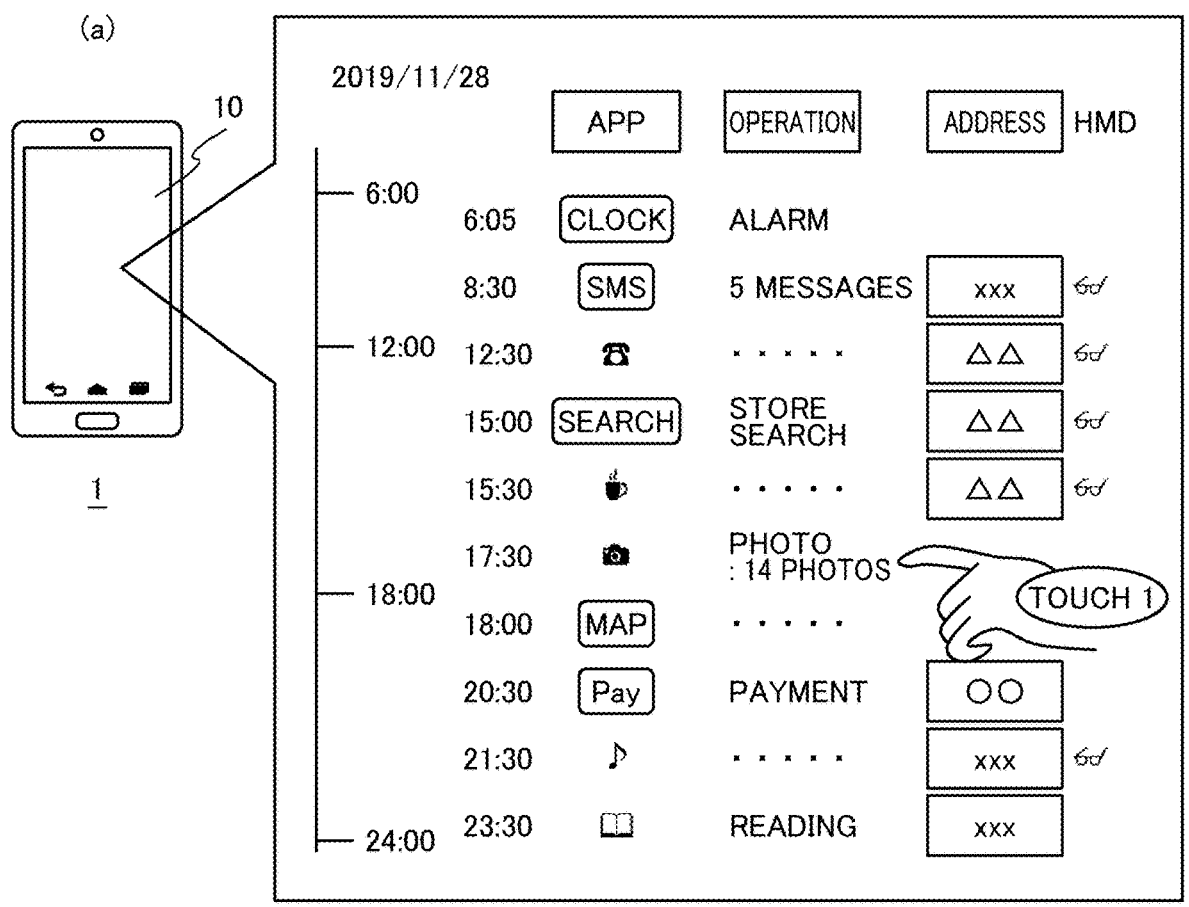
(b)
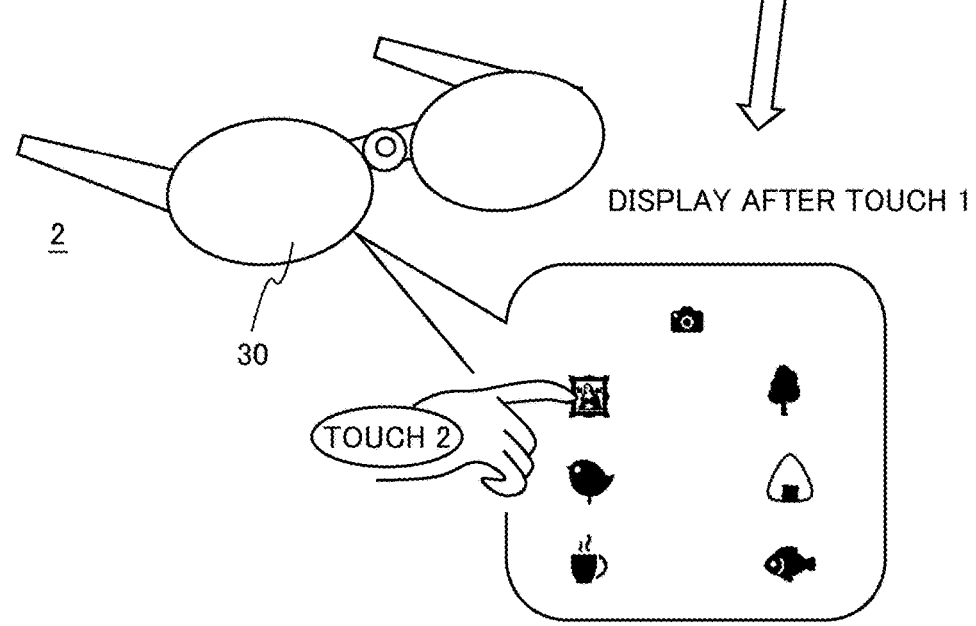
DISPLAY AFTER TOUCH 1

Fig.13
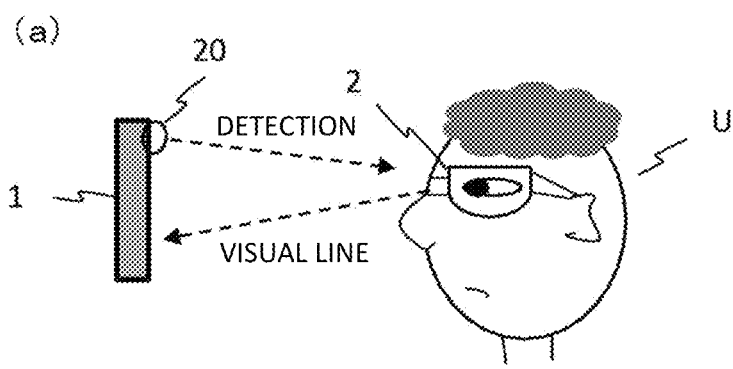
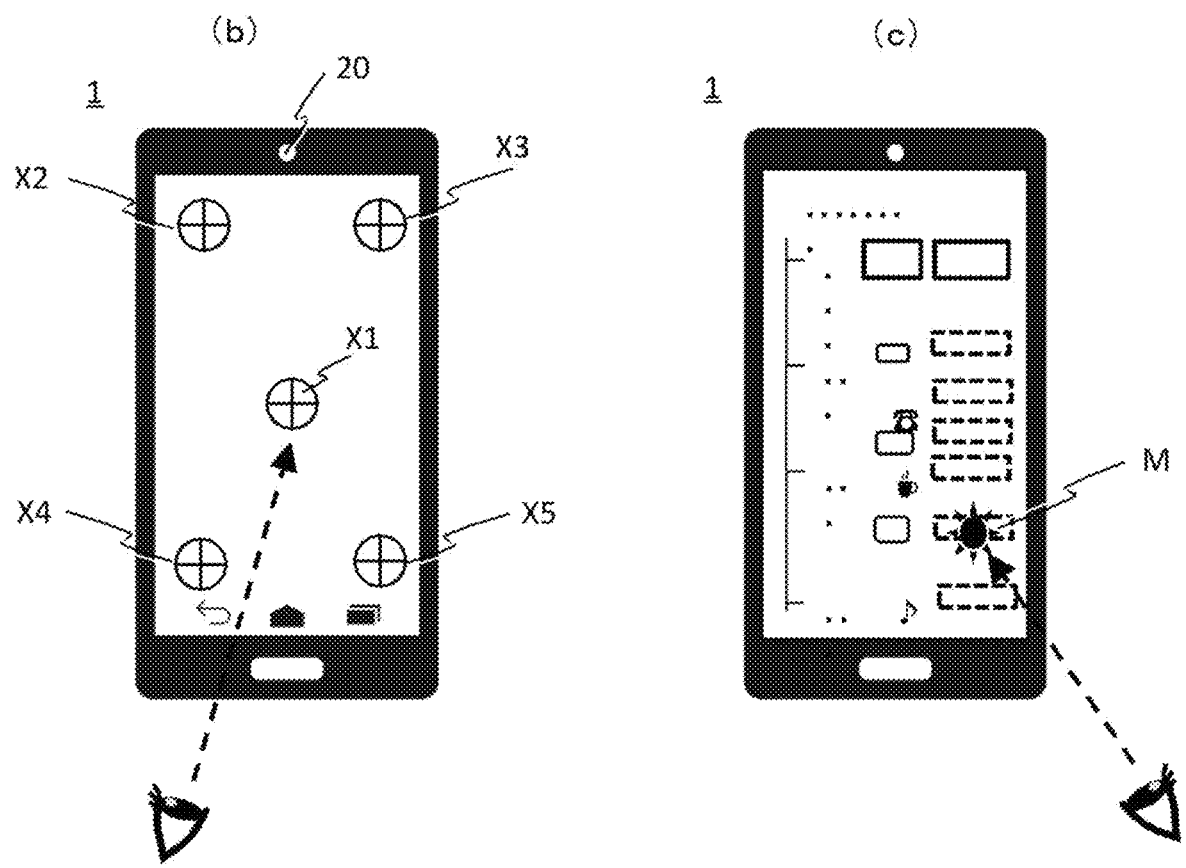

Fig.14
(a) GAZE IMAGE OF REFERENCE POSITION
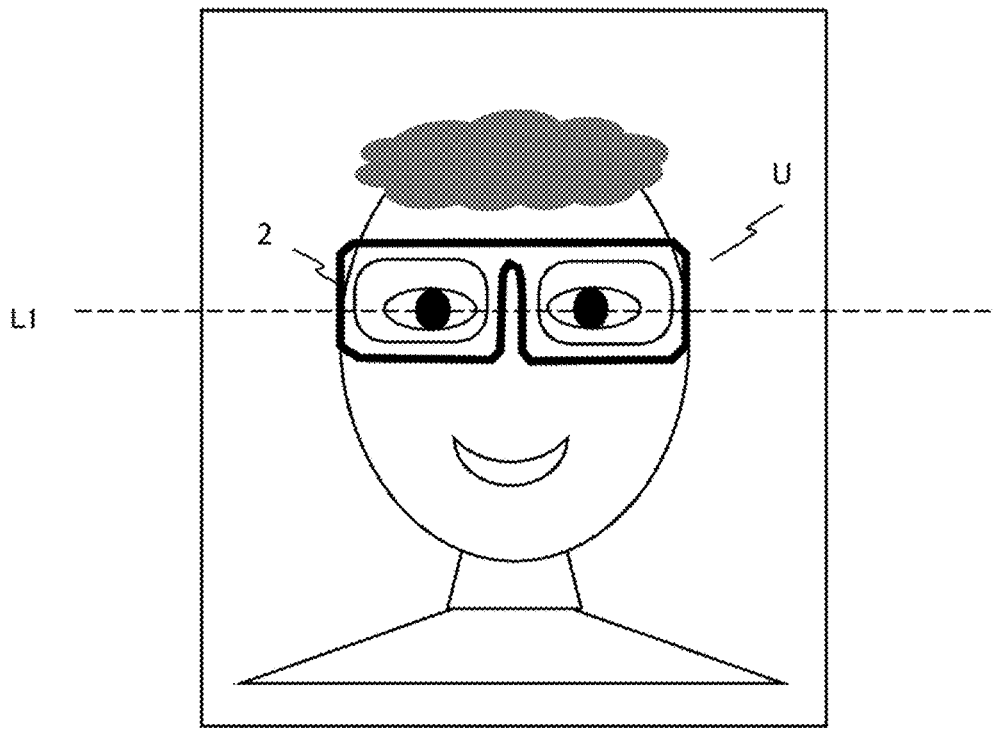
(b) GAZE IMAGE OF SELECTED POSITION
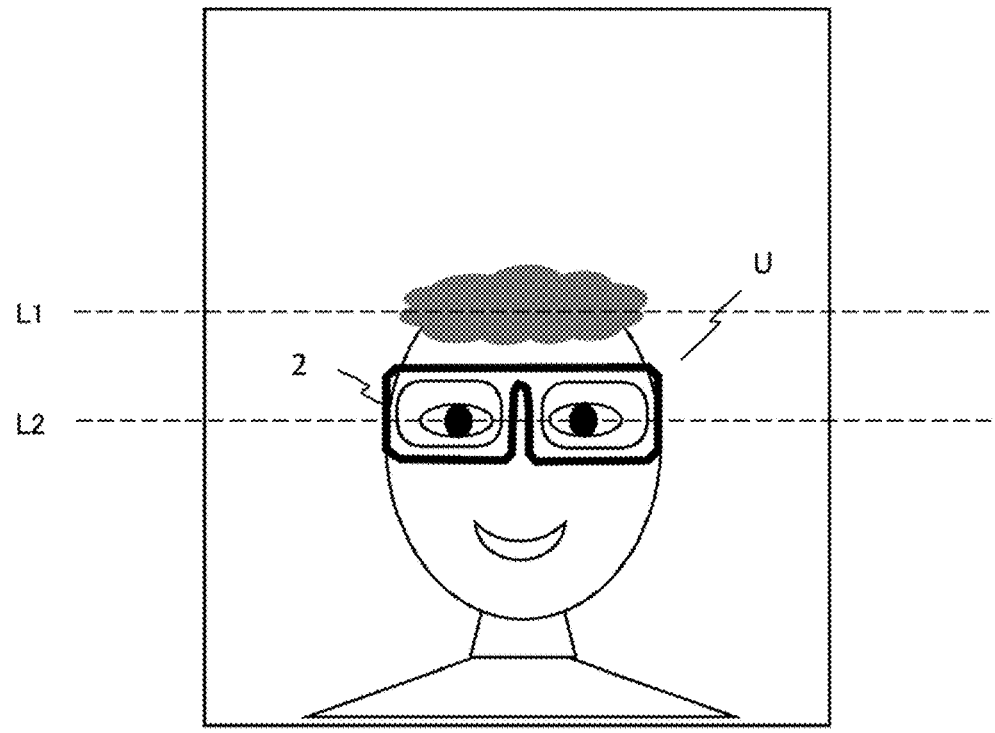

FIG.17
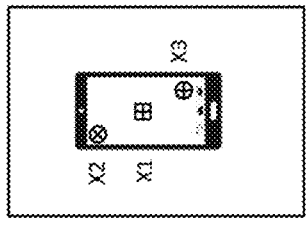
(a) TERMINAL IMAGE 1
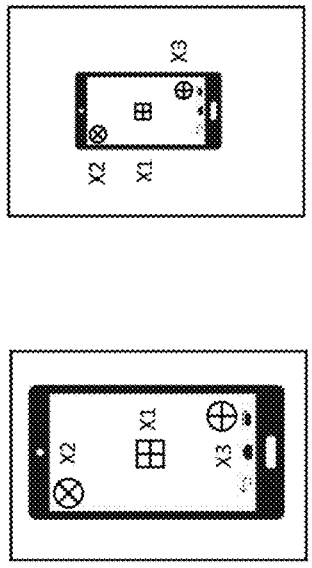
(b) TERMINAL IMAGE 2
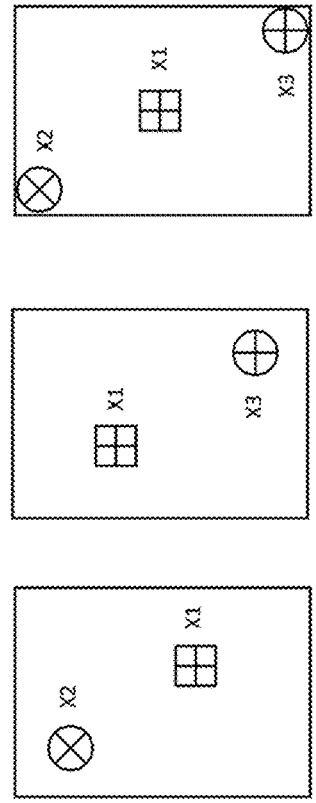
(c) TERMINAL IMAGE 3  (d) TERMINAL IMAGE 4  (e) TERMINAL IMAGE 5

FIG.18 (a) DETECTION OF REFERENCE POSITION  (b) DETECTION OF VISUAL POINT POSITION

PORTABLE TERMINAL, HEAD MOUNTED DISPLAY, AND COOPERATIVE DISPLAY SYSTEM THAT CONNECTS THE PORTABLE TERMINAL AND THE HEAD MOUNTED DISPLAY TO DISPLAY INFORMATION BY COOPERATION BETWEEN THE PORTABLE TERMINAL AND THE HEAD MOUNTED DISPLAY

TECHNICAL FIELD

The present invention relates to a technology of connecting a portable terminal and a head mounted display to perform information display in cooperation.

BACKGROUND ART

A portable terminal such as a smartphone is connected to a network and installs various applications, and thus, is capable of performing various operations, recording or reproducing data, and displaying them. In addition, a head mounted display (hereinafter, referred to as HMD) is a device that is worn on the head of a user and displays an image on a spectacle- or goggle-type display. A camera, a plurality of sensors such as a sensor measuring a distance to an object and a GPS sensor measuring a position, a CPU performing image processing, a battery, and the like are mounted on the HMD. As with the portable terminal, in the HMD, it is also possible to install an application to be used or upgrade the version.

Further, a new function or usage has been proposed by cooperation between the portable terminal and the HMD. For example, in Patent Document 1, a configuration is described in which in order to easily manage an application (hereinafter, an app) used by an HMD, screens displayed by the HMD and a terminal apparatus (portable information terminal) are shared, and the app is distributed to the HMD from an external server apparatus by operating the screen of the terminal apparatus.

CITATION LIST

Patent Document

Patent Document 1: WO 2017/138153 A1

SUMMARY OF THE INVENTION

Problems to be Solved by the Invention

A use and application range of the HMD is expected to expand exponentially. However, the HMD is originally used by being worn on the head, and thus, there is a limitation on the size of the screen that can be displayed on the display, processing ability, resolution, weight, and the like.

The portable terminal has characteristics such as a large display, advanced processing, and data recording, various utilization methods have been attained, and applications therefor have also been variously developed. However, since the display screen is large, there is a possibility that people around the user peek at the screen, and it is necessary to use the portable terminal cautiously from the viewpoint of the privacy.

Patent Document 1 described above is an example of a configuration in which the HMD and the portable terminal are used in cooperation, but in order to perform an operation for app acquisition, the operation is performed only by using the portable terminal that is easy to operate, and sharing functions by utilizing the characteristics of each device has not been sufficiently considered. For example, the display of hierarchical information or privacy protection is premised on the same display between two devices, and the usability of the user has not been particularly considered.

An object of the present invention is to attain an operation with excellent usability and a user-friendly display mode by utilizing the characteristics of each device in the case of displaying information by cooperation between a portable terminal and an HMD.

Solutions to Problems

In the present invention, the following method is adopted in order to attain the object described above.

The present invention relates to a portable terminal that is connected to a head mounted display to display information in cooperation, the terminal including: a first display displaying information; a memory storing the information displayed on the first display; a first controller controlling the display of the first display; and a first external equipment interface performing transmission and reception of information with respect to the head mounted display, in which the first controller performs control such that at least a part of the information displayed on the first display is transmitted to the head mounted display from the first external equipment interface, and is shared and displayed on a second display of the head mounted display.

In addition, the present invention relates to a head mounted display that is connected to a portable terminal and is worn on a head of a user to display information in cooperation, the display including: a second display displaying information; a second controller controlling the display of the second display; and a second external equipment interface performing transmission and reception of information with respect to the portable terminal, in which the second controller receives at least a part of the information displayed on the portable terminal through the second external equipment interface, and shares and displays the information on the second display.

In addition, the present invention relates to a cooperative display system that connects a portable terminal and a head mounted display to display information in cooperation, in which the portable terminal displays information on a first display, and transmits at least a part of the information that is displayed to the head mounted display, and the head mounted display shares and displays the information transmitted from the portable terminal on a second display.

Effects of the Invention

According to the present invention, it is possible to attain the operation with excellent usability and the user-friendly display mode by utilizing the characteristics of each device in the case of displaying the information by the cooperation between the portable terminal and the HMD.

BRIEF DESCRIPTION OF THE DRAWINGS

FIG. 3 is a diagram illustrating an internal configuration of the portable terminal.

FIG. 4 is a diagram illustrating an internal configuration of the HMD.

FIG. 5 is a diagram illustrating the type of data that is input and output between the portable terminal and the HMD.

FIG. 6 is a diagram illustrating a display example of an operational log in the portable terminal.

FIG. 9 is a diagram illustrating an example of performing display by sharing between the portable terminal and the HMD.

FIG. 13 is a diagram describing a visual line touch using a camera of the portable terminal (Example 2).

FIG. 14 is a diagram illustrating an example of a face image of a user, which is captured by the camera of the portable terminal.

FIG. 17 is a diagram illustrating an example of an image of the portable terminal, which is captured by the camera of the HMD.

MODE FOR CARRYING OUT THE INVENTION

An embodiment of the present invention will be described by using the drawings. In Examples described below, a cooperative display system will be described in which a portable terminal 1 and a head mounted display (HMD) 2 are connected to perform a display operation in cooperation.

Example 1

Figure 1:
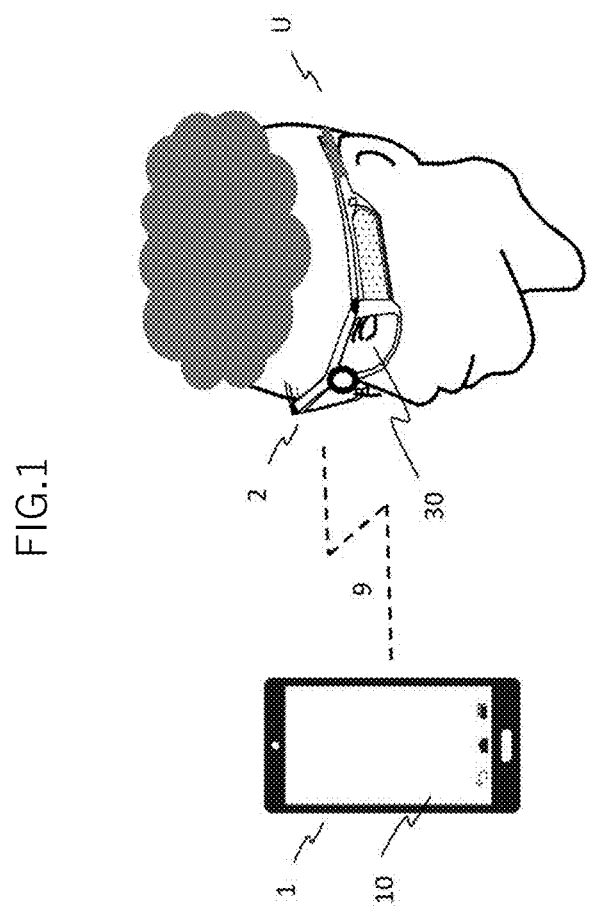
FIG. 1 is a schematic view illustrating a cooperative display system that connects a portable terminal and an HMD (Example 1).

FIG. 1 is a schematic view illustrating a cooperative display system that connects a portable terminal 1 and an HMD 2. The HMD 2 is worn on the head of a user U, and is connected to the portable terminal 1 in a wireless manner to perform an operation in cooperation while transmitting and receiving data or a command. The user U can see an image displayed on a display 30 of the HMD 2 while seeing an image displayed on a display 10 of the portable terminal 1. Here, in wireless connection 9, a local area network (LAN) may be used, or telephone network communication may be used. In addition, other communication methods such as Bluetooth (Registered Trademark) of near-field communication or an infrared communicator may be used, and the method may be selected in accordance with an information amount to be transmitted.

Figure 2:
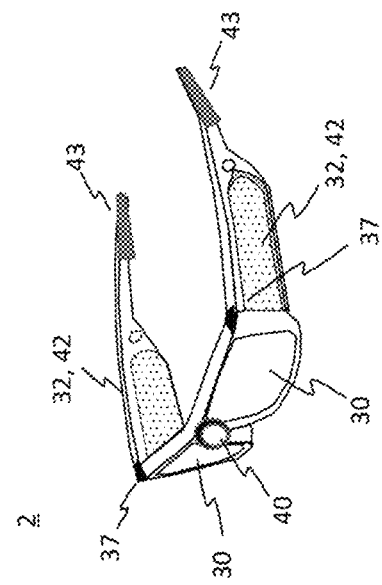
FIG. 2 is a diagram illustrating the appearance of the HMD.

FIG. 2 is a diagram illustrating the appearance of the HMD 2. The HMD 2 worn by the user includes components such as a display 30, a camera 40 (and microphone), a touch sensor 37, bone-conduction earphones (sound output) 43, a CPU 32, and a battery 42. The details of each constituent will be described below.

FIG. 3 is a diagram illustrating an internal configuration of the portable terminal 1. As the portable terminal 1, for example, a smartphone will be described, but a portable information terminal such as a tablet terminal also corresponds to the portable terminal.

The display 10 displays various images or information pieces, and a display controller 11 controls the display of the display 10. A CPU (main controller) 12 controls the entire operation of the portable terminal 1, and a memory 13 stores an operation program or the like that is executed by the CPU 12. A data storage memory 14 stores unique data of the portable terminal 1. Equipment ID information 15 stores unique equipment information for specifying the portable terminal 1.

An external equipment IF 16 is an interface for inputting and outputting data with respect to the HMD 2 by the wireless connection 9. A connection authentication with the HMD 2 is performed through the external equipment IF 16, and the data is transmitted to the portable terminal 1, and thus, whether the HMD 2 is connected to the portable terminal 1 is determined. A touch sensor 17 inputs the operation of the user with respect to the portable terminal 1, and can be integrated with the display 10.

A camera 20 includes an out-camera capturing the external scenery and an in-camera capturing the user U looking at the display 10, and a camera operation abnormality detector 20a detects the abnormality of the camera 20. Various sensors 21 detect the state of the portable terminal 1 (rotation, position, acceleration, and the like). A battery 22 supplies power to the portable terminal 1, and a battery capacity sensor 22a detects the residual capacity of the battery 22. A user authenticator 23 specifies the user of the portable terminal 1, and an external communicator 24 communicates with an external server (database and the like) through an external network 4.

FIG. 4 is a diagram illustrating an internal configuration of the HMD 2. A display 30 is capable of displaying image data generated in the HMD 2 and an image captured by the camera 40 in a superimposed manner while displaying an image input from the portable terminal 1. A display controller 31 controls the display of the display 30. The CPU (main controller) 32 controls the entire operation of the HMD 2, and a memory 33 stores an operation program or the like that is executed by the CPU 32. Equipment ID information 35 stores unique equipment information for specifying the HMD 2.

An external equipment IF 36 transmits and receives data between the portable terminal 1 by the wireless connection 9. A touch sensor 37 inputs the operation of the user with respect to the HMD 2.

The camera 40 captures the external scenery of the HMD 2, and a camera operation abnormality detector 40a detects the abnormality of the camera 40. Various sensors 41 are a sensor such as a gyroscope that measures the position or the distance of an object captured by the camera 40, and measures the motion, the acceleration, and the rotation of the HMD 2. A sensor operation abnormality detector 41a detects the operation abnormality of the various sensors 41. A battery 42 supplies power to the HMD 2, and a battery capacity sensor 42a detects the residual capacity of a battery 7.

A sound output 43 drives bone-conduction earphones, and a sound output abnormality detector 43a detects the operation abnormality of the sound output 43.

FIG. 5 is a diagram illustrating the type of data that is input and output between the portable terminal 1 and the HMD 2 through the external equipment IFs 16 and 36.

Data output to the HMD 2 from the portable terminal 1, shown in (a), is a unique ID for specifying the portable terminal 1, image data for displaying information on the HMD 2, by using camera image data and ranging data input from the HMD 2, image data for displaying an augmented reality (AR) image considering a back-and-forth relationship in a depth direction, and a command for responding to the operation input from the HMD 2, and the like.

Data output to the portable terminal 1 from the HMD 2, shown in (b), is a unique ID for specifying the HMD 2, image data captured by the camera 40, detection data (position, distance, acceleration, rotation, battery capacity, user authentication, and the like) of the various sensors 41, and operation input data with respect to the HMD 2 (touch operation, gesture, sound input, and the like).

<Operation of Portable Terminal>

Various applications operated by the portable terminal 1 are stored in the memory 13, and a plurality of icons of applications that can be selected by the user are displayed on a home screen displayed at the time of activation. When such an icon that is displayed is touched, the corresponding application is activated.

The portable terminal 1 has an operational log display function that records and as necessary, is capable of displaying when, where, and how to use which application or which device. Hereinafter, an "operational log app" for displaying an "operational log" operated by using the portable terminal 1 and the HMD 2 will be described as an example.

Such an "operational log app" automatically starts an operation for acquiring the operational log when the portable terminal 1 is activated. According to such a function, the operational log such as an activation time of an app to which an operation instruction is input, an app name, operation contents, position information, and the presence or absence of use of the HMD 2 is stored in the data storage memory 14.

In the case of displaying the operational log that is stored, operational log information stored in the data storage memory 14 is displayed on the display 10 as a list. In a case where the displayed operational log is selected by the touch sensor 17, the details of the selected operational log are displayed.

Note that, the operational log information that is stored in the data storage memory 14, for example, is transmitted to an external app company 5a through the external communicator 24 and the network 4, and is used for examining the usage condition or the like of the portable terminal 1. For other apps that are stored in the portable terminal 1, similarly, information such as the usage condition is transmitted to the external app company 5b.

<Operation of HMD>

Various data pieces are sent to the HMD 2 from the portable terminal 1 through the external equipment IFs 16 and 36. Such data includes the operational log information, and the operational log information is also displayed on the display 30 of the HMD 2. In this example, in the operational log displayed on the portable terminal 1, detailed information (lower-level information in hierarchical information or additional information) of an item selected by the user in accordance with the touch operation is shared and displayed on the HMD 2. Accordingly, a user-friendly display mode is attained by utilizing the characteristics of each device (portable terminal 1 and HMD 2). Alternatively, as with Example 3 described below, in a case where there is a possibility that people around the user peek at the display on the portable terminal 1, the display is shared and displayed on the HMD 2. Accordingly, there is an effect of protecting the privacy of the user.

FIG. 6 is a diagram illustrating a display example of the operational log in the portable terminal 1. In the portable terminal 1, the operation contents of the user are recorded by using the operational log app. FIG. 6 illustrates an example in which operation contents for one day are displayed in chronological order. For example, assuming that an alarm goes off in a clock app of the portable terminal 1 in the initial operation of Date: 2019 Nov. 28, as the operational log thereof, Time: 06:05, Application (App): Clock, and Operation Contents: Alarm, Address, and the HMD 2 is not used (icon of HMD is not displayed) are displayed. Next, Time: 08:30, App: Short Message Service (SMS), and Operation Contents: Five Times of Message Transmission and Reception, and the HMD 2 is used (icon of HMD is displayed) are displayed. Similarly, the operation contents are sequentially displayed, and as the final operation of the day, Time: 23:30, App: Electronic Book App, and Operation Contents: Reading, and the HMD 2 is not used (icon of HMD is not displayed) are displayed.

Note that, here, the operational log is displayed in the condition of Date: 2019 Nov. 28, but it is also possible to perform setting such that information that is recorded, such as the items other than the date, the number of display rows and columns, and the time, is selected and displayed.

Figure 7:
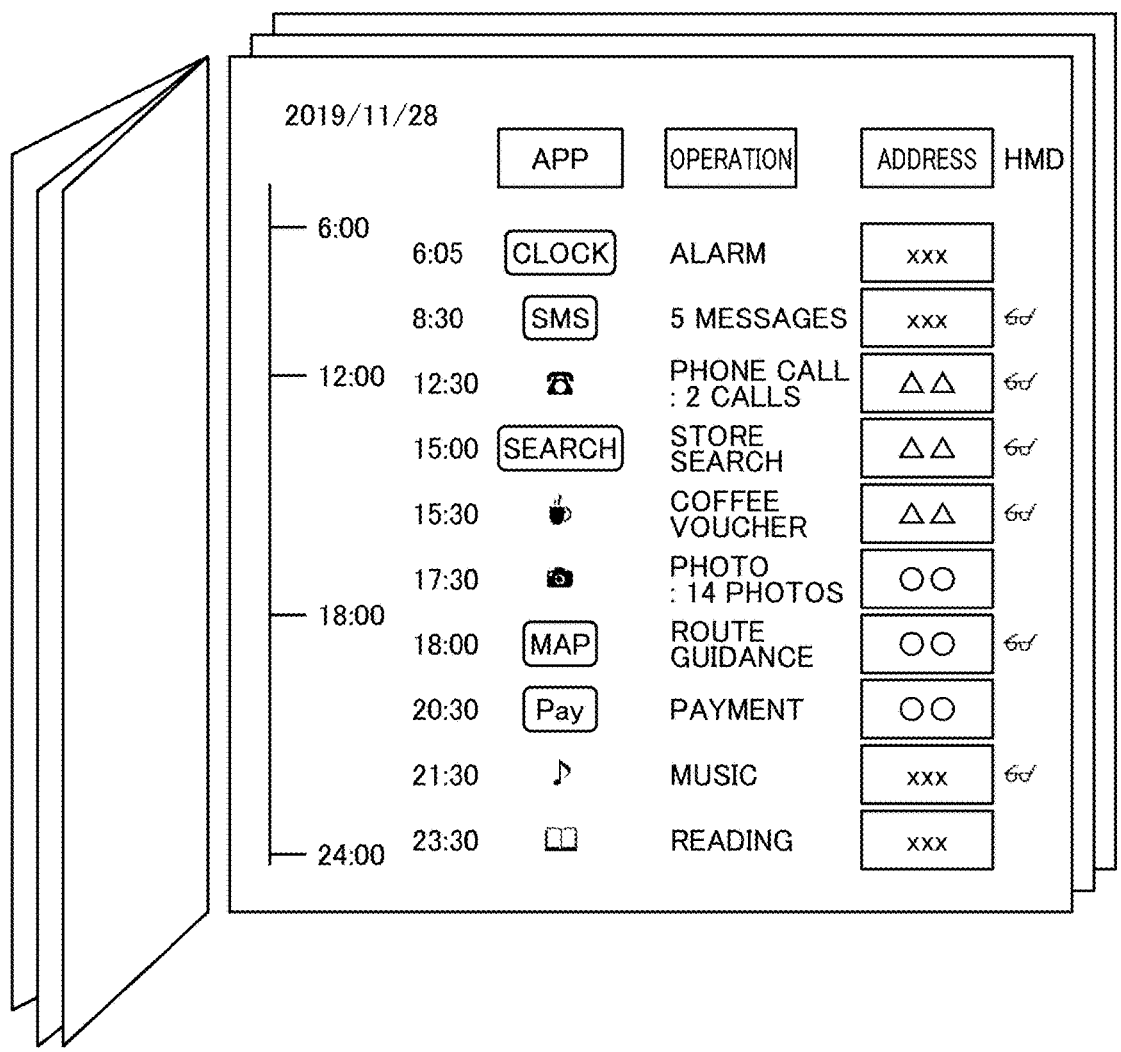
FIG. 7 is a diagram illustrating another display example of the operational log in the portable terminal.

FIG. 7 is a diagram illustrating another display example of the operational log in the portable terminal 1. In FIG. 6, the operation contents for one day are displayed, whereas in FIG. 7, operation contents for a plurality of days are displayed. That is, FIG. 7 illustrates an example in which the operational log is displayed in a format where the operation contents for a plurality of days are stacked with the operation contents for one day as one page, and the past operational log can be simply referred to by turning over the pages like a diary.

The operational log shown in FIG. 6 or FIG. 7 is information relevant to the operation contents, and is capable of further displaying detailed information executed by the operation.

Figure 8:
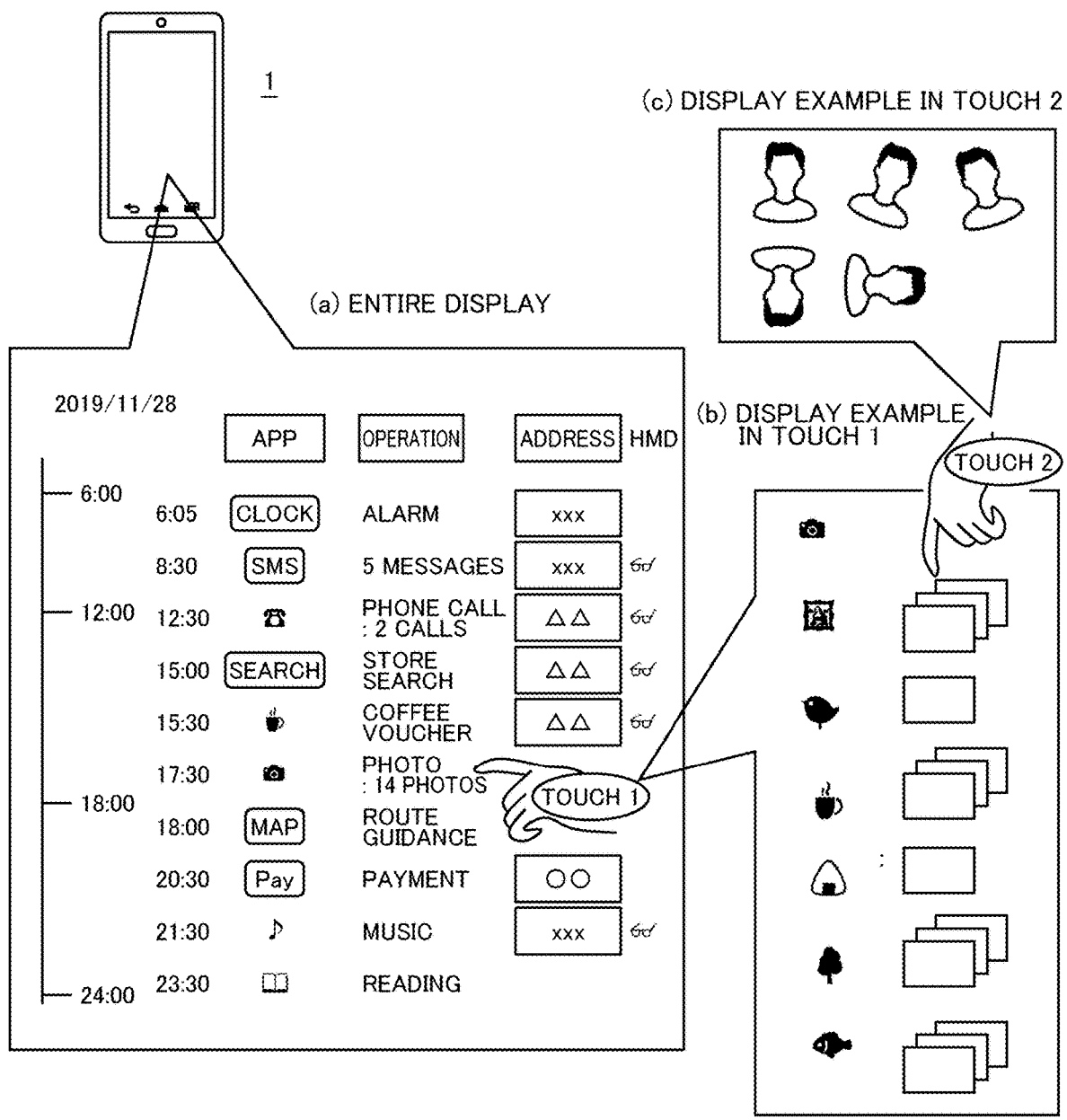
FIG. 8 is a diagram illustrating an example of hierarchically displaying detailed information of the operational log.

FIG. 8 is a diagram illustrating an example of hierarchically displaying the detailed information of the operational log. Here, FIG. 8 illustrates an example in which the date, the time, the app, the operation contents, and the like are selected by a touch with a finger, and the detailed information is displayed.

For example, it is assumed that "14 photos" is touched by a camera app operated at 17:30 on the screen of the entire display in (a) (Touch 1). As a result thereof, as illustrated in (b), the recorded photo is displayed for each type (display example in Touch 1). Here, six types of categories are displayed, and the number of photos included in each category is further displayed.

In a case where the displayed photo number information is further touched (Touch 2), as illustrated in (c), the list of photos included in the touched category is displayed (display example in Touch 2). As described above, by digging down into the detail of the hierarchy of the display contents, it is possible to specifically grasp the operation contents performed at this time. In addition, it is possible to look back on such contents later, as with the diary.

An example in which the operational log is displayed only on the portable terminal 1 has been described, but a part of the information can be transmitted to the HMD 2 and can also be shared and displayed on the HMD 2. As illustrated in FIG. 6 to FIG. 8, the portable terminal 1 is capable of displaying a large amount of information, and for example, in a case where information in the lower hierarchy is displayed along with the operational log, each display area decreases, and the displayed information is less likely to be seen. Therefore, for example, detailed information in the lower hierarchy is shared and displayed by using the HMD 2. Since the HMD 2 is a device to be worn on the head of the user, a letter size that can be displayed is small and the contents decrease, compared to the portable terminal 1. Therefore, in the operational log displayed on the portable terminal 1 illustrated in FIG. 8, the operation in Touch 1 is performed, and the detailed information in the lower hierarchy is shared and displayed on the HMD 2.

FIG. 9 is a diagram illustrating an example of performing display by sharing between the portable terminal 1 and the HMD 2. Here, as illustrated in (a), the entire screen of the operational log is displayed on the portable terminal 1, and as illustrated in (b), the detailed information in the lower hierarchy is displayed on the display 30 of the HMD 2. As described above, for example, as the detailed information, the category of the type of photo as illustrated in FIG. 8(*b*) is displayed, or the plurality of photos included in the category as illustrated in FIG. 8(*c*) are sequentially displayed as a thumbnail or a photo image. Accordingly, the user easily sees the information, compared to a case where the information is displayed only on the portable terminal 1.

In addition, in the HMD 2, the method of an optical system is different from that in the portable terminal 1, and the HMD 2 has characteristics that the display contents are less likely to be seen by the other people around the user. By displaying information that is desired not to be seen by the other people (for example, photo) in the information displayed on the portable terminal 1 on the HMD 2, only the user can see the information, and there is also an advantage in terms of privacy protection. In addition, since the information amount displayed on the portable terminal 1 is also limited, the portable terminal can be used as a plurality of displays by sharing the display information with the HMD 2, and usability is improved.

As described above, in this example, the operational log is shared and displayed on the portable terminal 1 and the HMD 2. For the operational log displayed on the HMD 2, it is possible for the user to select a display item such as a photo and SMS message contents or to display the detailed contents of the displayed operational log on the portable terminal 1, in the setting of the operational log app. In addition, in a case where there are people around the user, the selected item is displayed on the HMD 2, and the detailed contents of the operational log can also be displayed. Note that, it is obvious that a case where the information is displayed on the HMD 2 is limited to a case where the HMD 2 is connected to the portable terminal 1, and display data is transmitted to the HMD 2 from the portable terminal 1. The operation in a case where there are other people around the user will be described in detail in Example 3.

Figure 10:
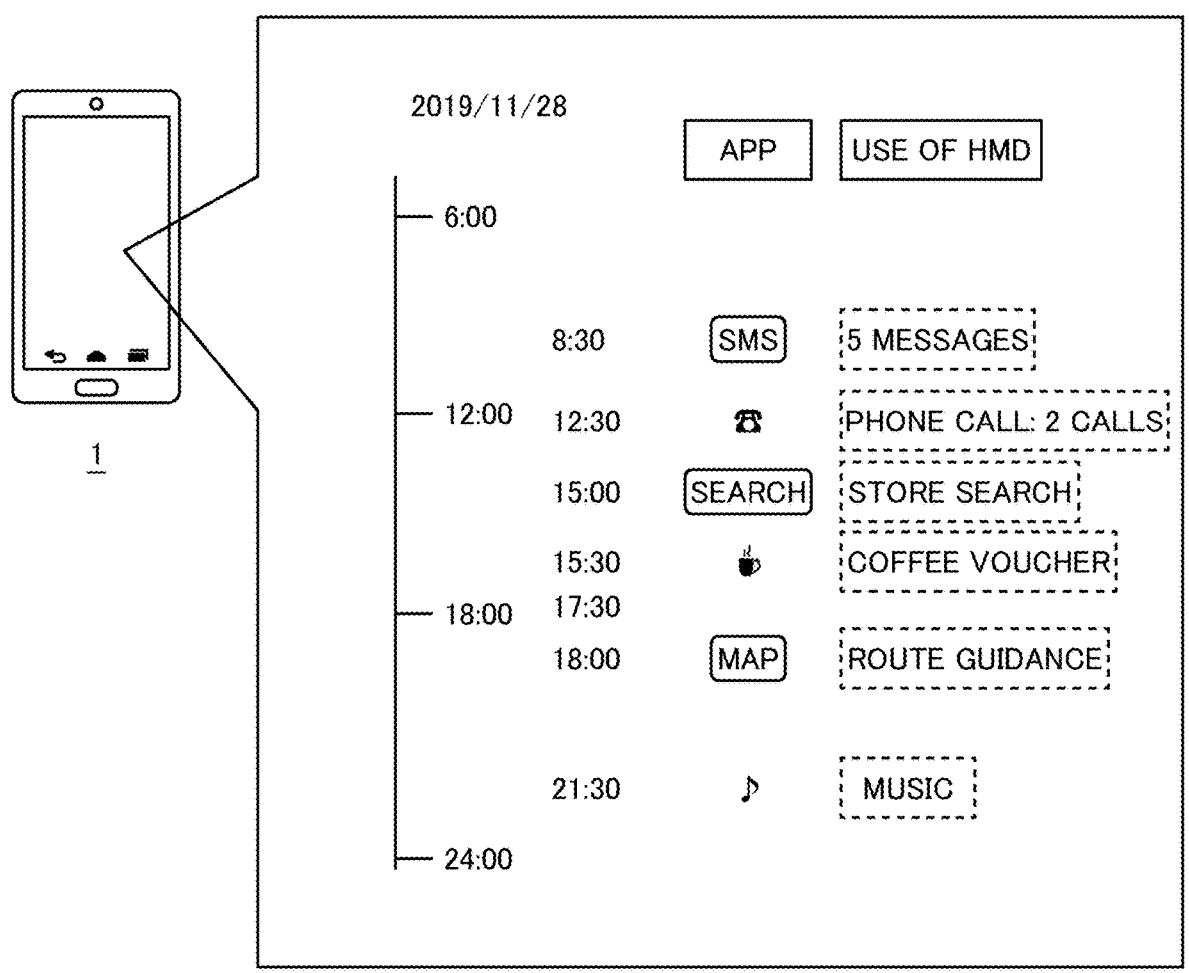
FIG. 10 is a diagram illustrating a modification example of the display in the portable terminal.

FIG. 10 is a diagram illustrating a modification example of the display in the portable terminal 1. Only the operation using the HMD 2 in the operational log is displayed, and the operation not using the HMD 2 is deleted, compared to the display example illustrated in FIG. 6. For example, in the operational log at Time: 06:05 (App: Clock, Operation Contents: Alarm), the operational log at Time: 17:30 (App: Camera, Operation Contents: 14 Photos), and the operational log at Time: 23:30 (App: Electronic Book App, Operation Contents: Reading), displayed in FIG. 6, the HMD 2 is not used, and thus, such operational logs are not displayed in FIG. 10. Note that, here, it is obvious that by selecting the displayed operational log using the HMD, the details thereof can be displayed as illustrated in FIG. 8, or can be shared and displayed on the HMD 2 as illustrated in FIG. 9.

Next, each operation flow of the portable terminal 1 and the HMD 2 for performing a share display function of this example will be described.

Figure 11:
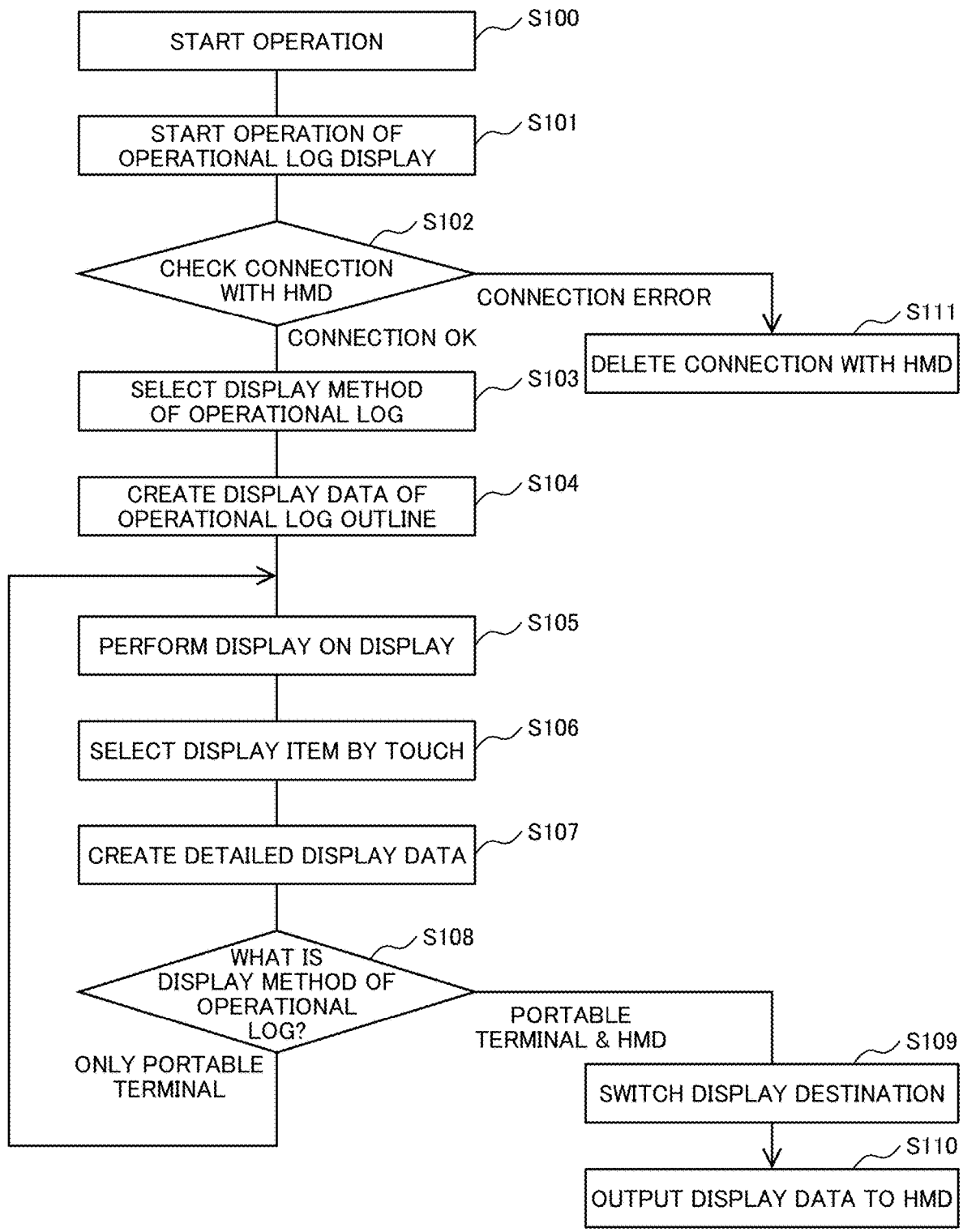
FIG. 11 is a flowchart illustrating an operation procedure of the portable terminal.

FIG. 11 is a flowchart illustrating an operation procedure of the portable terminal 1. The operation of the portable terminal 1 is started (S100), the operational log app is activated, and a display function of the operational log operated with respect to the portable terminal 1 is executed (S101).

A connection check between the portable terminal 1 and the HMD 2 is performed (S102). Accordingly, the portable terminal 1 checks that data is normally transmitted and received with respect to the HMD 2, and the HMD 2 is worn by the user in accordance with sensor information (acceleration information and the like) from the HMD 2. Such connection check is performed periodically or when there is an event (such as the selection of the display item) of the portable terminal 1. In a case where there is a connection error in the determination of S102, communication with HMD 2 is ended, and the connection is deleted (S111).

In a case where the connection is OK in the determination of S102, the user selects a display method of the operational log. In such selection, independent display only on the portable terminal 1 (examples of FIG. 6 to FIG. 8) or share display between the portable terminal 1 and the HMD 2 (example of FIG. 9) is selected (S103).

The portable terminal 1 creates the entire display data of the operational log outline (content display of operational log illustrated in FIG. 6). In addition, display data of the operational log outline for displaying on the HMD 2 in the case of using the HMD 2 is also created (S104). The created entire display data of the operational log outline is displayed on the display 10 of the portable terminal 1 (S105).

In the operational log displayed on the display 10, when the user touches and selects an item of which the details are desired to be displayed (S106), the detailed display data is created (S107). For example, in a case where the operational log is touched as illustrated in FIG. 8(*a*) (Touch 1), data that is displayed in Touch 1 is extracted from the data storage memory 14 and created.

Next, the process branches at the display method of the operational log selected in S103 (S108). In the case of the independent display only on the portable terminal 1, the process returns to S105, and the detailed display data created in S107 is displayed on the display 10 of the portable terminal 1. Further, in S106, in a case where the user touches the item of which the details are desired to be displayed (Touch 2), the detailed data that is displayed in Touch 2 is created and displayed.

On the other hand, in the case of the share display between the portable terminal 1 and the HMD 2 at the branch in S108, a display destination is switched such that a part of the display data is displayed on the HMD 2 (S109). Then, a part of the display data is output to the HMD 2 through the external equipment IF 16 (S110). For example, as illustrated in FIG. 9, the detailed data selected in Touch 1 is output to the HMD 2. In the HMD 2, the detailed data is received or is displayed on the display 30.

Figure 12:
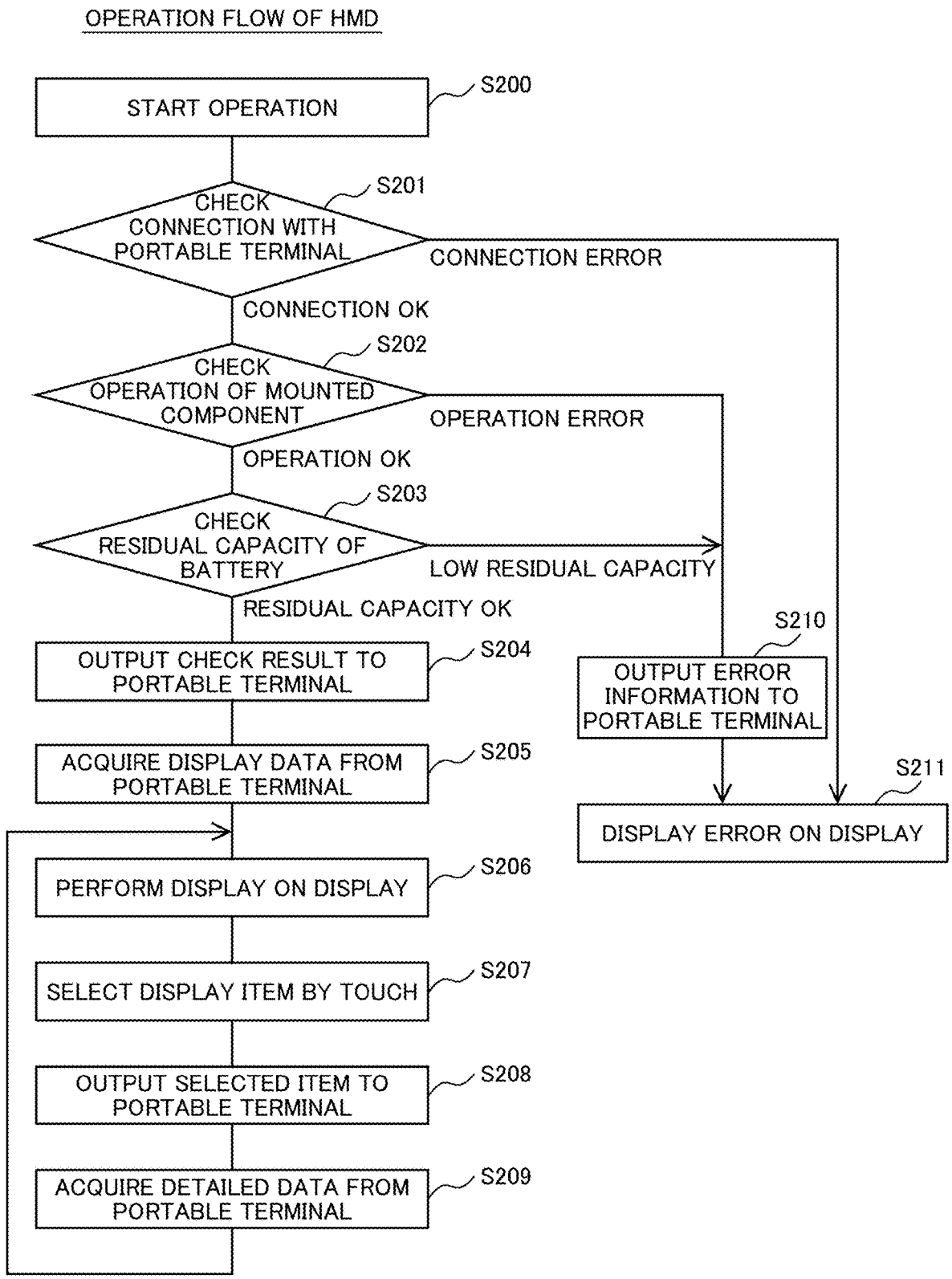
FIG. 12 is a flowchart illustrating an operation procedure of the HMD.

FIG. 12 is a flowchart illustrating the operation procedure of the HMD 2. Here, as illustrated in FIG. 9, a case where the operational log is shared and displayed on the HMD 2 will be described. The operation of the HMD 2 is started (S200), and the connection check with the portable terminal 1 is performed (S201).

In the camera operation abnormality detector 40*a* and the sensor operation abnormality detector 41*a*, an operation check on various components (camera, sensor, display, and the like) mounted on the HMD 2 is performed (S202). In addition, in the battery capacity sensor 42*a*, the residual capacity of the battery 42 of the HMD 2 is checked (S203).

In a case where it is determined that there is a connection error in the determination of S201, the occurrence of an error is displayed on the display 30 (S211). In a case where there is an operation error in any of the components in the determination of S202, or in a case where the battery residual capacity is low in the determination of S203, error information is sent to the portable terminal 1 (S210), and the error information is displayed on the display 30 of the HMD 2 (S211). Note that, by outputting the error information to the portable terminal 1 in S210, an error may be displayed on the HMD 2 in accordance with an instruction from the portable terminal 1, in S211.

In a case where there is no abnormality in the check of S201 to S203, a check result of the HMD 2 is output to the portable terminal 1 (S204). Then, the portable terminal 1 checks that the HMD 2 is worn by the user, various operations are normal, and the display data output from the portable terminal 1 can be displayed.

The HMD 2 acquires the display data from the portable terminal 1 through the external equipment IF 36 (S205). This corresponds to step S110 in FIG. 11. The acquired display data is displayed on the display 30 of the HMD 2 (S206). Accordingly, for example, an image (after Touch 1) as illustrated in FIG. 9(*b*) is displayed.

On the display screen in S206, an item (icon) desired to be displayed next is selected by the touch operation from the user (S207). For example, in FIG. 9(*b*), the operation of Touch 2 is received. Alternatively, the end of the display can also be selected. A selection operation of the user is performed by the touch sensor 37 or the gesture input of the HMD 2.

The information of the item selected in S207 is output to the portable terminal 1 through the external equipment IF 36 (S208). The portable terminal 1 creates the detailed data of the selected item, and the HMD 2 acquires the detailed data from the portable terminal 1 (S209). Then, returning to S206, the acquired detailed data is displayed on the display 30. Accordingly, for example, display for responding to the operation of Touch 2 in FIG. 9(*b*) is displayed.

Note that, the "operational log" used in the above description is the hierarchical information, and is a preferred example for describing an operation of reading out information in the lower-level hierarchy. That is, this is because the operational log is configured by recording information such as the location and the cooperative device with respect to an instruction operation from the user, which is performed with respect to the portable terminal, in chronological order.

Sharing the information that is displayed on the portable terminal and the HMD is not limited to the operational log. As another example, the sharing can also be applied to a case where, when displaying a book on the portable terminal to read, the meaning of a word that the user does not understand is displayed on the HMD, or a case where, when displaying a map on the portable terminal, detailed information on a specific location in the map is displayed on the HMD. In addition, when watching a movie on the portable terminal, it is also possible to find out the blog of a character or to search for geographic information of the background on the HMD. The point is that the additional information can be shared and displayed on the HMD not to interfere with the screen of the portable terminal.

As described above, in Example 1, the portable terminal and the HMD configure the display screen in cooperation. In this case, the HMD is treated as a child screen of the portable terminal, and information that is not capable of being displayed on the screen of the portable terminal or hierarchically lower-level information is displayed on the HMD side. Accordingly, the display contents of the portable terminal are directly retained, and the contents can be checked by looking at the portable terminal, and more detailed information can also be simultaneously seen on the HMD. Accordingly, it is possible to attain an operation with excellent usability and a user-friendly display mode by utilizing the characteristics of each device.

Example 2

In Example 1, a method for using the touch sensors 17 and 37 of the portable terminal 1 or the HMD 2 in order to select the corresponding item when the detailed contents of the displayed operational log are desired to be displayed has been described. Here, there are many cases where the camera is mounted on the general portable terminal 1 or the HMD 2. Therefore, in Example 2, a method for detecting the visual line of the user by using the camera and selecting the item (hereinafter, referred to as "visual line touch") will be described.

FIG. 13 is a diagram illustrating the visual line touch using the camera 20 of the portable terminal 1. In the visual line touch, which item the direction of the ocular bulbs (visual line) of the user is looking at is detected, and the item is selected. (a) illustrates a state in which the user U is looking at the display screen of the portable terminal 1. Which position (which item) on the display screen the visual line of the user U is looking at, that is, where the visual line is detected by using the camera (in-camera) 20 that is mounted on the portable terminal 1.

(b) illustrates an example of the screen of the portable terminal 1. In the detection of the visual line of the user U, first, for example, five cross-points (X1 to X5) are displayed in sequence on the screen of the portable terminal 1 at a predetermined time interval. The user sequentially looks at these displayed cross-points, in accordance with an instruction from the portable terminal 1. In this case, the direction of the ocular bulbs, that is, a visual line direction is detected by the camera 20 of the portable terminal 1, and the reference position or the angle of the visual line of the user is obtained from the visual line direction to these five cross-points.

For example, a difference in the position or the direction of the pupils or irises of the ocular bulbs when the user is gazing at the cross-points X2 and X3 on the upper end portion of the screen is detected on the basis of the position of the face or the position or the direction of the pupils or irises of the ocular bulbs when the user is gazing at the cross-point X1 in the middle of the screen. Similarly, a difference in the position or the direction of the pupils or irises of the ocular bulbs when the user is gazing at X4 and X5 on the lower end portion of the screen is detected on the basis of a case where the user is gazing at X1 in the middle of the screen. Further, by the same method, a difference in the position or the direction in a case where the user is gazing at the middle and the right and left ends is detected, and the detected value thereof is accumulated in the data storage memory 14.

(c) illustrates a state in which the user U is actually gazing at a certain position in the screen. By comparing the visual line position of the user that is captured by the camera 20 (position of face and position or direction of pupils or irises of ocular bulbs) with the visual line position with respect to the cross-point, which is the reference position, the current visual line position of the user is calculated. Then, a marker M indicating the gaze point of the visual line of the user is displayed in the calculated position on the screen.

Note that, in the detection of the visual line, the values of the angle, the position, or the distance between the portable terminal 1 and the face and the ocular bulbs of the user U are important. For use in the visual line touch, it is necessary to correct the reference direction of the visual line described above by checking the fluctuation (accuracy) of the angle, the position, or the distance between the portable terminal 1 and the face or the ocular bulbs, and the pupils or irises, with the camera 20, the distance sensor 21, or the like of the portable terminal 1.

FIG. 14 is a diagram illustrating an example of a face image (user image) of the user that is captured by the camera (in-camera) 20 of the portable terminal 1. (a) illustrates a state in which the user U is gazing at the reference position (cross-point X1 in FIG. 13) in the screen. According to such an image, the visual line direction of the user U is obtained, and is set to a reference value. In addition, (b) illustrates a state where the user U is currently gazing at a desired position (selected position) in the screen. When the gaze position is changed, the image of the user U, in particular, the position, the angle, or the like of the face or the ocular bulbs of the user is changed.

In this example, it is found that in the gaze image (b) of the selected position, the size of the face decreases and the distance increases, compared to the gaze image (a) of the reference position. In addition, the center position of the eyes is shifted downward as illustrated by a broken line L1→L2. Note that, a distance to the face may be detected by the distance sensor 21, instead of the difference in the camera image.

Here, the measured value of the position or the distance of the face or the ocular bulbs obtained from the gaze image of the selected position in (b) is corrected by obtaining a difference amount from the measured value obtained when the user is gazing at the five cross-points (X1 to X5) in FIG. 13(*a*) as a reference, and thus, it is possible to calculate the position in the screen that the user is currently gazing. That is, by using the camera 20 of the portable terminal 1, it is possible to detect which position on the screen the user is gazing at.

Figure 15:
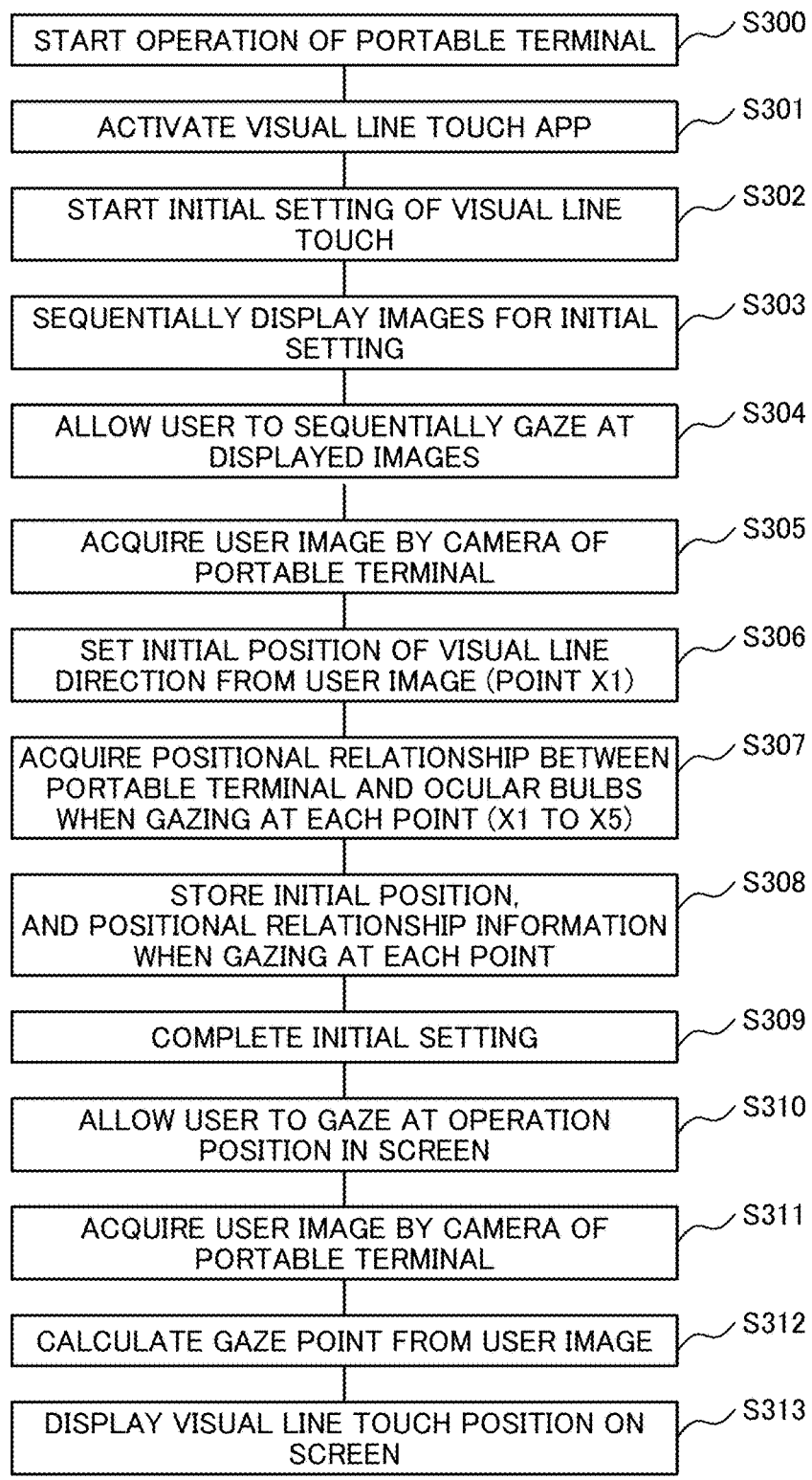
FIG. 15 is a flowchart illustrating an operation procedure of the visual line touch using the camera of the portable terminal.

FIG. 15 is a flowchart illustrating an operation procedure of the visual line touch using the camera 20 of the portable terminal 1.

The operation of the portable terminal 1 is started (S300), and a visual line touch app is activated (S301).

The initial setting of the visual line touch is started (S302). An image for the initial setting of the visual line touch is displayed on the display 10 of the portable terminal 1 (S303). For example, the cross-points X1 to X5 as illustrated in FIG. 13(*a*) are sequentially displayed.

The user sequentially gazes at images (cross-points) displayed on the display 10 through the HMD 2 that the user is wearing (S304).

An image of the ocular bulbs of the user who is gazing at the images is acquired by the camera 20 mounted on the portable terminal 1 (S305).

The reference value of the visual line direction is calculated from the information of the user image acquired when the cross-point X1 is displayed, and is set to the initial position of the visual line touch (S306).

A calculation result of the visual line position when the user sequentially gazes at each of the cross-points X1 to X5 is stored together with the information of the initial position of the visual line touch. In this case, a positional relationship (angle, position, and distance) between the portable terminal 1 and the ocular bulbs is acquired by the sensor 21 of the portable terminal 1. In addition, in a case where the HMD 2 is mounted, the position, the direction, or the like of the pupils or irises of the ocular bulbs is also acquired by distance information to the portable terminal 1 or an eye-tracking camera (S307).

The initial position calculated in S306, and positional relationship information between the portable terminal 1 and the ocular bulb when gazing at each of the cross-points, which is acquired in S307, are stored in the data storage memory 14 of the portable terminal 1 in association with the equipment ID 35 of the HMD 2 or user information (S308).

The initial setting is completed (S309). Note that, the average value of the gaze points of the cross-points X2 to X5 is obtained, and in a case where the average value is approximately the same position as the gaze point of the cross-point X1, it may be determined that each of the gaze points has been correctly detected.

Next, a visual line touch operation is actually performed. The user gazes at a desired operation position in the screen of the portable terminal 1 (S310).

The image of the ocular bulbs of the user who is gazing at the images is acquired by the camera 20 mounted on the portable terminal 1 (S311).

The visual line direction of the user is obtained from the information of the acquired user image, and the gaze point of the user is calculated, compared to the positional relationship information when gazing at each point, which is stored in the data storage memory 14 in S308, (by obtaining a difference) (S312).

The position of the gaze point on the screen of the portable terminal 1, that is, the visual line touch position is displayed with a marker (S313). In a case where the gaze point remains at the position displayed with the marker for a certain period of time or longer, an operation such as click or touch with a fingertip is performed on the position with the marker.

Here, in order to accurately perform the visual line touch operation described above, the distance between the portable terminal 1 and the face, the angle, the position, and the distance with respect to the ocular bulbs, and the like are constantly checked, and in a case where there is a change, it is necessary to correct a change in the visual line position due to a change in the face or the ocular bulbs from the reference point. Accordingly, the angle, the position, the distance, and the like between the portable terminal and the face or the ocular bulbs are constantly monitored on the basis of the position of the initial setting, in a case where there is a certain level of difference or more, in the initial setting, a deviation is corrected on the basis of a value calculated by a motion range of the obtained visual line.

In the correction of the visual line touch, an icon that is frequently used in the application, such as an operational log end icon, is displayed at a position set as a mark, and whether the icon is accurately grasped is checked at a certain frequency, and thus, a correctable deviation is corrected.

The visual line touch operation can also be performed by using the camera 40 mounted on the HMD 2. Hereinafter, this case will be described.

Figure 16:
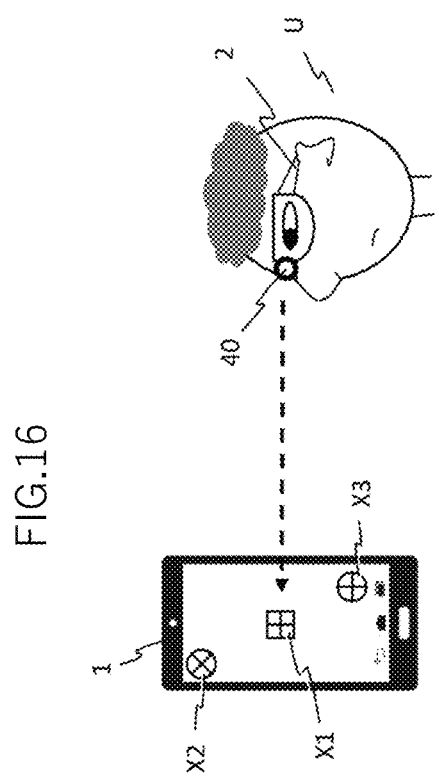
FIG. 16 is a diagram describing a visual line touch using a camera of the HMD.

FIG. 16 is a diagram illustrating the visual line touch using the camera 40 of the HMD 2. In order to specify the visual line position, for example, as illustrated in FIG. 16, the images of cross-points X1 to X3 to be a reference are displayed on the screen of the portable terminal 1. For example, the point X1 is displayed in the middle of the screen, the point X2 is displayed at the left top corner of the screen, and the point X3 is displayed at the right bottom corner of the screen. The user U gazes at the displayed cross-points in accordance with the instruction from the portable terminal 1, which is captured by the camera 40 of the HMD 2. Then, an image captured by the camera 40 is sent to the portable terminal 1.

In the portable terminal 1, the center position to be a reference is obtained from the acquired camera image of each cross-point. For example, in a case where the average value of the positions of the cross-points X2 and X3 at the corners of the screen is approximately the same position as the position of the cross-point X1 in the middle of the screen, the position of the cross-point X1 is set as the reference position of the visual line touch. Here, in order to detect the position or the angle of the pupils or irises of the ocular bulbs, in a case where an eye-tracking camera is mounted on the HMD 2, the information thereof may be used. Note that, in the detection of the visual line, the angle, the position, or the distance between the portable terminal 1 and the HMD 2, the position or the angle of the HMD 2 with respect to the ocular bulbs (position or angle when HMD is worn on head), and the like are important.

FIG. 17 is a diagram illustrating an example of the image of the portable terminal 1, which is captured by the camera 40 of the HMD 2. The gaze point of the user U with respect to the screen of the portable terminal 1 is detected from the image of the portable terminal 1 (here, referred to as a "terminal image"), which is captured by the camera 40 of the HMD 2. In the adjustment of the initial position, in a case where the portable terminal is captured as with a terminal image 1 in (a), the entire screen of the portable terminal 1 can be seen, and information for detecting which point the user is gazing at can be acquired, which is preferable.

However, for example, in a case where the distance between the portable terminal 1 and the HMD 2 excessively increases, the entire portable terminal 1 is captured as a small image, as with a terminal image 2 in (b). Accordingly, in the detection of the gaze point, an error occurs, and it is difficult to accurately detect the gaze point. In such a case, an instruction is issued such that the HMD 2 gets closer to the portable terminal 1.

In addition, in the case of a terminal image 3 in (c), since the capturing center is misaligned to an upper left direction of the portable terminal 1, there is an instruction to move to the lower right direction. On the contrary, in the case of a terminal image 4 in (d), since the capturing center is misaligned to a lower right direction of the portable terminal 1, there is an instruction to move to the upper left direction.

A terminal image 5 in (e) illustrates that the entire screen of the portable terminal 1 is captured to the fullest extent, and it is not possible to get closer any further. As described above, adjustment is performed such that the portable terminal 1 is captured in the state of the terminal image 1 in (a).

Note that, as with the case of using the camera 20 of the portable terminal 1 described above, it is necessary to set the angle, the position, the distance, and the like between the portable terminal 1 and the HMD 2 to be in a certain range. Accordingly, it is necessary to add correcting the reference position of the visual line set as described above by constantly checking a change in the angle, the position, or the like between the portable terminal 1 and the HMD 2.

Figure 18:
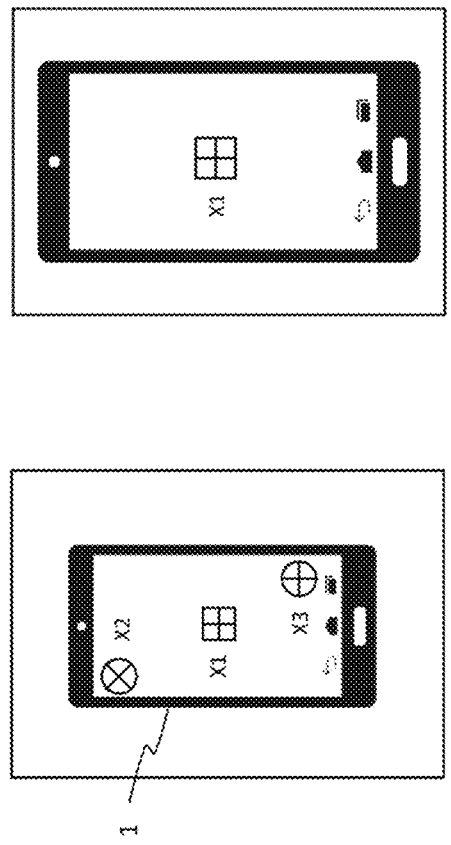
FIG. 18 is a diagram illustrating an example of obtaining a visual point position by a terminal image captured by the camera of the HMD.

FIG. 18 is a diagram illustrating an example of obtaining a visual point position by the terminal image captured by the camera 40 of the HMD 2. (a) illustrates the case of obtaining the reference position of the screen of the portable terminal 1, and (b) illustrates the case of obtaining the visual point position of the user from the actually acquired terminal image.

In the terminal image in (a), the distance or the angle of the HMD 2 with respect to the screen of the portable terminal 1 is detected by three cross-points X1 to X3 to obtain the reference position. For such a numerical value, which difference the terminal image in (b) has is detected. In such an example, in the terminal image in (b), since the middle of the screen (cross-point X1) is in the middle of the range captured by the HMD 2, it is found that the portable terminal 1 is approximately in front of the HMD 2. In addition, since the screen of the portable terminal 1 is captured enlargedly, it is found that the distance to the HMD 2 decreases compared to when capturing the terminal image in (a).

Here, in a case where the screen of the portable terminal 1 is modified into a trapezoidal shape or a rhomboidal shape, this is because the portable terminal 1 is retained obliquely. In such a case, the oblique state can be detected by detecting position information of four corners of the screen of the portable terminal 1. Then, for the gaze point position obtained in the setting of the reference position in (a), it is possible to detect which point on the screen of the portable terminal 1 the user is gazing at in (b). Note that, in a case where the eye-tracking camera is mounted on the HMD 2, and the position or the direction of the pupils or irises of the ocular bulbs can be measured, the accuracy of obtaining the gaze point is improved by using the position or the direction as a parameter.

Figure 19:
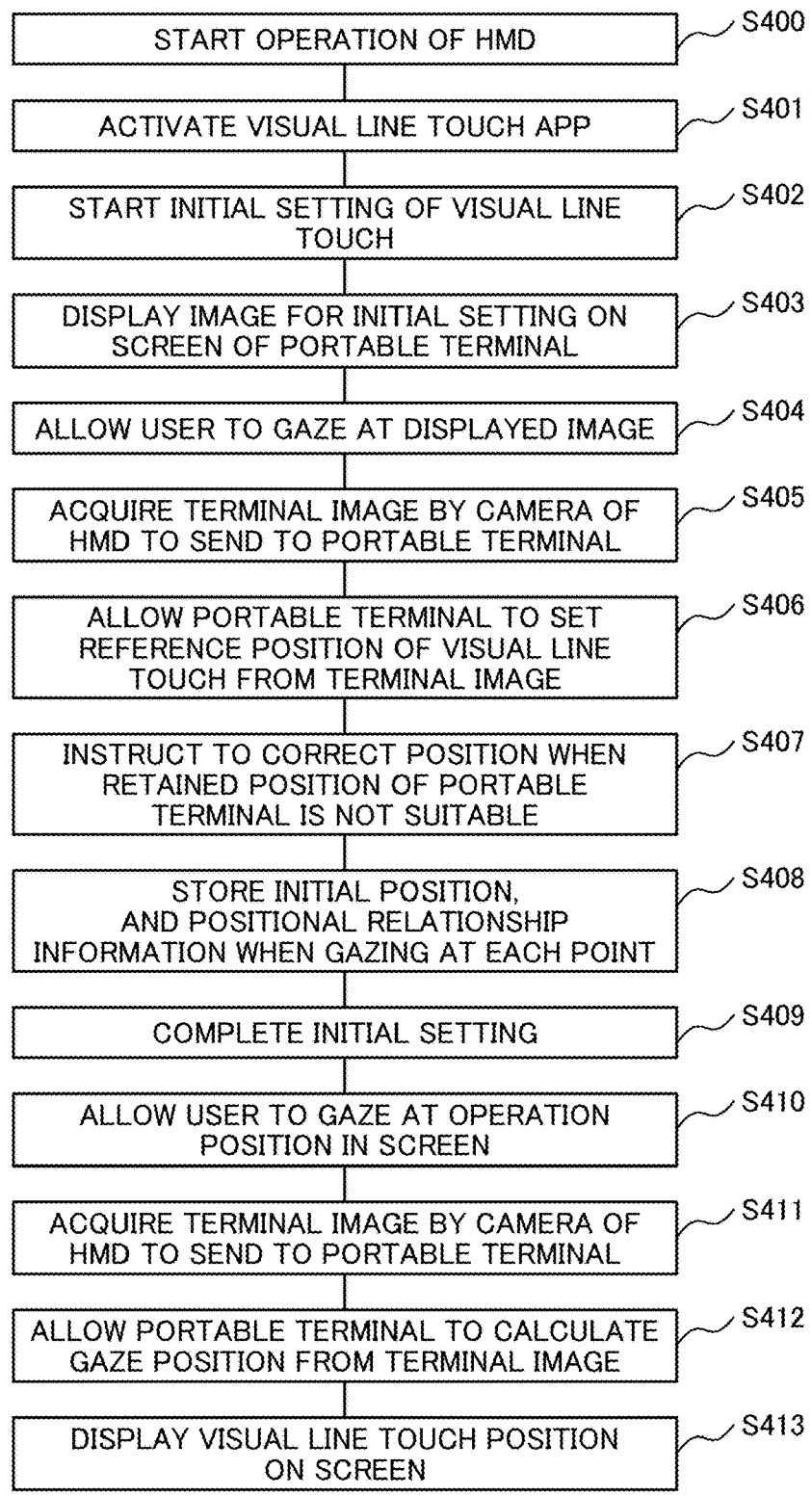
FIG. 19 is a flowchart illustrating the operation procedure of the visual line touch using the camera of the HMD.

FIG. 19 is a flowchart illustrating an operation procedure of the visual line touch using the camera 40 of the HMD 2.

The operation of the HMD 2 is started (S400), the visual line touch app is activated, and a command for activating the app is sent to the portable terminal 1, too (S401).

The initial setting of the visual line touch is started (S402). In the portable terminal 1, the image (cross-point) for the initial setting of the visual line touch is displayed on the display 10 (S403). For example, the cross-points X1 to X3 as illustrated in FIG. 16 are displayed.

The user gazes at the image displayed on the portable terminal 1 through the HMD 2 (S404).

The image of the portable terminal 1 that the user is gazing at is captured by the camera 40 mounted on the HMD 2, and is sent to the portable terminal 1 through the external equipment IF 36. The portable terminal 1 acquires the image (terminal image) of the portable terminal, which is captured by the HMD 2 (S405).

In the portable terminal 1, the position and the angle of the HMD 2 are calculated from the position of the displayed image, and the terminal image captured by the HMD 2, and is set to the reference position of the visual line touch (S406).

In this case, when the distance between the portable terminal 1 and the HMD 2 excessively increases or the angle is excessively oblique, an instruction to correct a retention position of the portable terminal 1 is issued to the user. Then, the information of the angle and the position between the portable terminal 1 and the HMD 2, and angle information of the pupils or irises of the ocular bulbs by the eye-tracking camera mounted on the HMD 2, and the like are acquired (S407).

The initial position calculated in S406, the information of the angle and the position between the portable terminal 1 and the HMD 2, which is acquired in S407, the equipment ID 35 of the HMD 2, and the user information are stored in the data storage memory 14 in association with each other (S408). The initial setting is completed (S409).

Next, the visual line touch operation is actually performed. The user gazes at a desired operation position in the screen of the portable terminal 1 through the HMD 2 (S410).

The image (terminal image) of the portable terminal 1 that the user is gazing at is acquired by the camera 40 mounted on the HMD 2, and is sent to the portable terminal (S411).

The portable terminal 1 compares the acquired terminal image with the information of the angle and the position with respect to the HMD 2, which is stored in the data storage memory 14 in S408, and obtains which point on the screen of the portable terminal 1 the user is gazing at by calculation (S412).

The position of the gaze point on the screen of the portable terminal 1, that is, the visual line touch position is displayed with a marker (S413). In a case where gaze point remains at the position displayed with the marker for a certain period of time or longer, an operation such as click or touch with a fingertip is performed on the position with the marker.

Note that, the distance or the angle between the portable terminal and the HMD, the angle of the HMD when worn by the user, and the like are constantly monitored on the basis of the position of the initial setting, and when there is a certain level of difference or more, a deviation is corrected.

In the example described above, the image captured by the camera 40 of the HMD 2 is sent to the portable terminal 1, and the distance or the angle is obtained on the portable terminal 1 side, but the present invention is not limited thereto, and such processing may be performed on the HMD 2 side, or may be performed on an external server through a network.

According to Example 2, it is possible for the user to select a desired display item only by gazing at the display screen of the portable terminal, and to display the detailed information relevant to the selected item. Accordingly, the user-friendliness of a user operation for switching the display contents is improved.

Example 3

In Example 1, a part of the detailed contents of the operational log displayed on the portable terminal 1 is displayed on the HMD 2. It may not be preferable that the display of the operational log of the portable terminal 1 is seen by the other people, from the viewpoint of privacy. From this viewpoint, the HMD 2 has an advantage that the focus is out on the lens of the spectacles, which is a display surface, due to with a difference in the method of the optical system, and thus, it is difficult for the people around the user to see what is being displayed. Therefore, in Example 3, a configuration of actively using the HMD 2 for display will be described in consideration of the privacy.

In this example, the acquired operational log information is displayed by suitably switching the portable terminal 1 and the HMD 2. Then, in order to prevent the operational log that is displayed from being seen by the people around the user, a "peek prevention function" is added. According to the "peek prevention function", in an environment where the other people easily peek at the operational log or in a case where the operational log is not desired to be seen, the operational log information is not displayed on the portable terminal 1, but is displayed on the HMD 2. There are the case of automatically performing the "peek prevention function" and the case of selectively performing the "peek prevention function" by the user.

First, the case of automatically performing the peek prevention function will be described.

Figure 20:
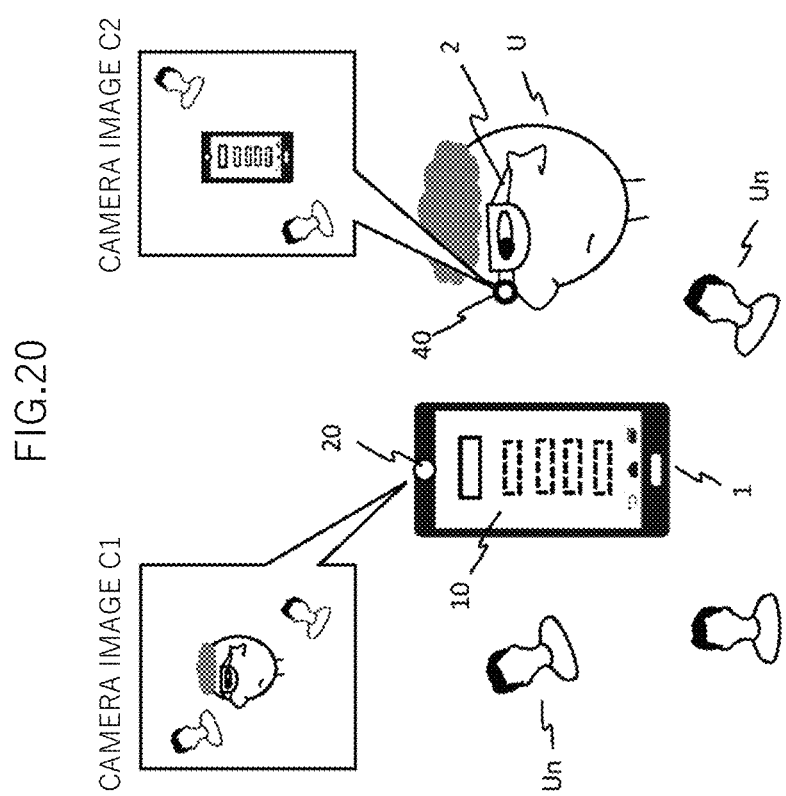
FIG. 20 is a configuration diagram for automatically performing a peek prevention function (Example 3).

FIG. 20 is a diagram illustrating a configuration of automatically performing the peek prevention function. The user U is wearing the HMD 2 and is looking at the display screen of the portable terminal 1. There are other people Un around the user U, and there is a possibility that the other people peek at the screen of the portable terminal 1.

In such a case, an image around the user when using the portable terminal 1 is captured by the camera 20 mounted on the portable terminal 1 (here, in-camera capturing user U side). In a case where the people Un other than the user U are captured in a camera image C1 that is captured, it is determined that there is a possibility of peeking. In this case, a front image of the user may be captured by using the camera 40 of the HMD 2, and whether there are the people Un with a possibility of peeking in a camera image C2 that is captured may be detected.

In this case, as a point, it is desirable that the cameras 20 and 40 for capturing include a wide-angle lens. The degree of wide angle is required to be greater than or equal to a viewing angle at which the display 10 of the portable terminal 1 can be seen from the surroundings.

In addition, the direction of the faces of the captured people Un other than the user U is detected, an angle with respect to the display 10 of the portable terminal 1 is detected, and in a case where the angle is greater than or equal to the viewing angle of the display 10, it is possible to determine that the possibility of peeking is low.

Note that, in order to specify the user U captured in the camera images C1 and C2, face authentication or the like can be used. In addition, when the peek prevention function is operated, it is important to monitor whether the cameras 20 and 40 are constantly operated or are operated at a certain interval.

Constantly operating the cameras 20 and 40 or continuously operating the cameras at a certain interval may cause unwanted camera capturing, and thus, may be required to consider the privacy of the other people. Therefore, it is necessary to clearly indicate on the portable terminal 1 or the like to inform the people around the user that the camera is being operated or the peek prevention function is being operated. For example, it is desirable to clearly indicate on the portable terminal by lighting up the lamp of the portable terminal 1.

Figure 21:
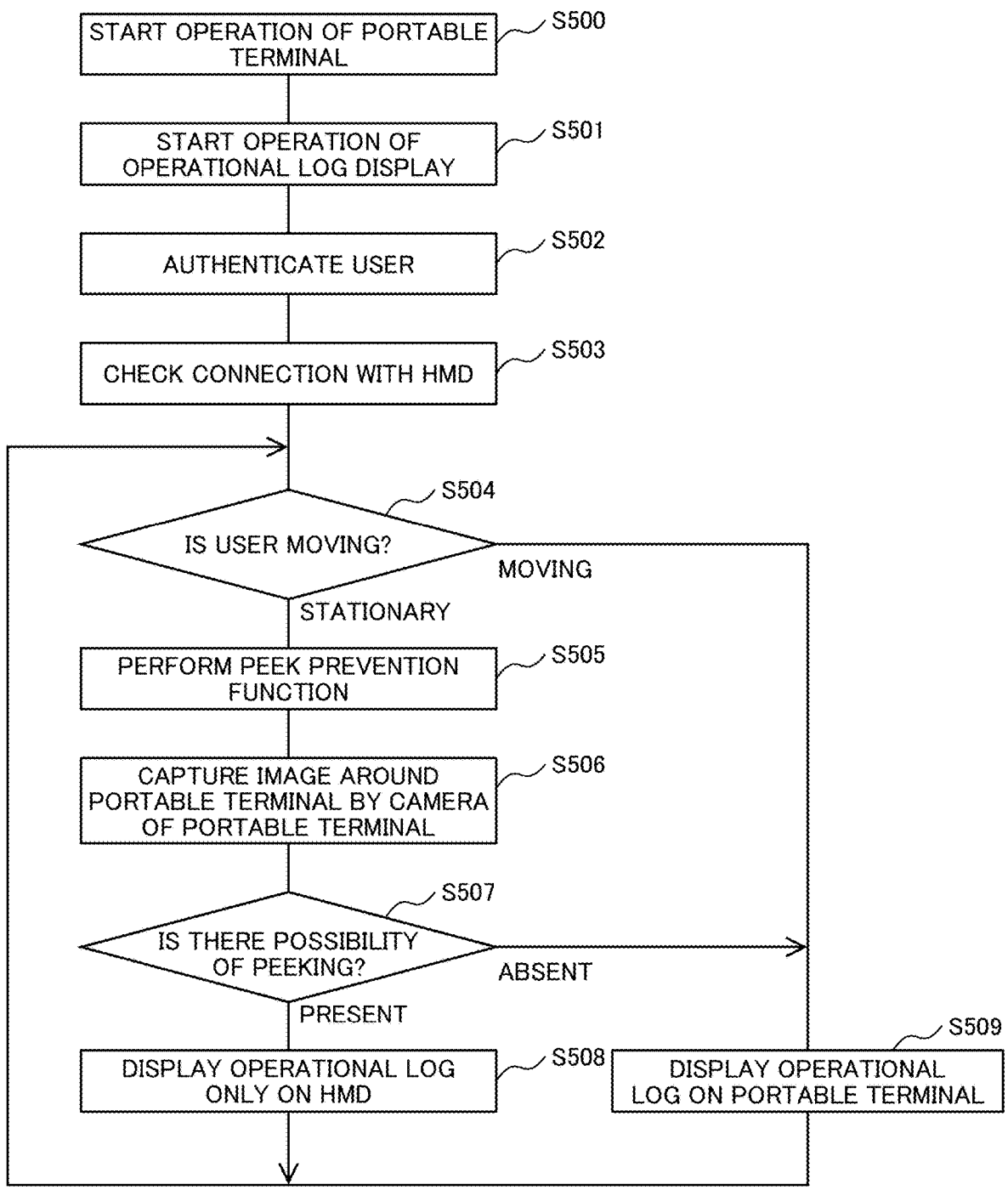
FIG. 21 is a flowchart in a case where the peek prevention function is automatically performed.

FIG. 21 is a flowchart in a case where the peek prevention function is automatically performed.

The operation of the portable terminal 1 is started (S500), the operational log app is activated, and the display function of the operational log operated with respect to the portable terminal 1 is executed (S501). The user is authenticated (S502), and the connection with the HMD 2 is checked (S503). In a case where there is a connection error, the communication with the HMD 2 is ended, and the connection is deleted.

Whether the user is moving is determined from the acceleration information from the sensor 21 of the portable terminal 1 (S504). In a case where the user is moving, the process proceeds to S509, and the possibility of peeking is low, and thus, the display is performed by using the screen of the portable terminal 1.

In a case where the user is stationary in the determination of S504, there is the possibility of peeking, and thus, the "peek prevention function" is executed (S505).

The image around the user is captured by the camera 20 of the portable terminal 1. Alternatively, an image around the portable terminal 1 may be captured by the camera 40 of the HMD 2 (S506).

The presence or absence of the people other than the user is determined from the captured camera image. Further, the presence or absence of the possibility of peeking is determined from the angle between the captured people and the display 10 of the portable terminal 1, and the like (S507).

In a case where it is determined that there is the possibility of peeking in S507, the display of the operational log on the portable terminal 1 is stopped, and the operational log is displayed only on the HMD 2 (S508). In addition, even in a case where an operation (selection) of displaying the detailed information is further performed on the information of the operational log displayed on the HMD 2, the detailed information is displayed only on the HMD 2.

On the other hand, in a case where it is determined that there is no possibility of peeking in S507, the operational log is directly displayed on the portable terminal 1 or is displayed by using both of the portable terminal 1 and the HMD 2 (S509).

After that, returning to S504, whether the user is moving is determined again, the presence or absence of the possibility of peeking is determined in S507, and the display is switched. As described above, the display only on the HMD 2 continues until there is no possibility of peeking.

Next, the case of selectively performing the peek prevention function by the user will be described.

Figure 22:
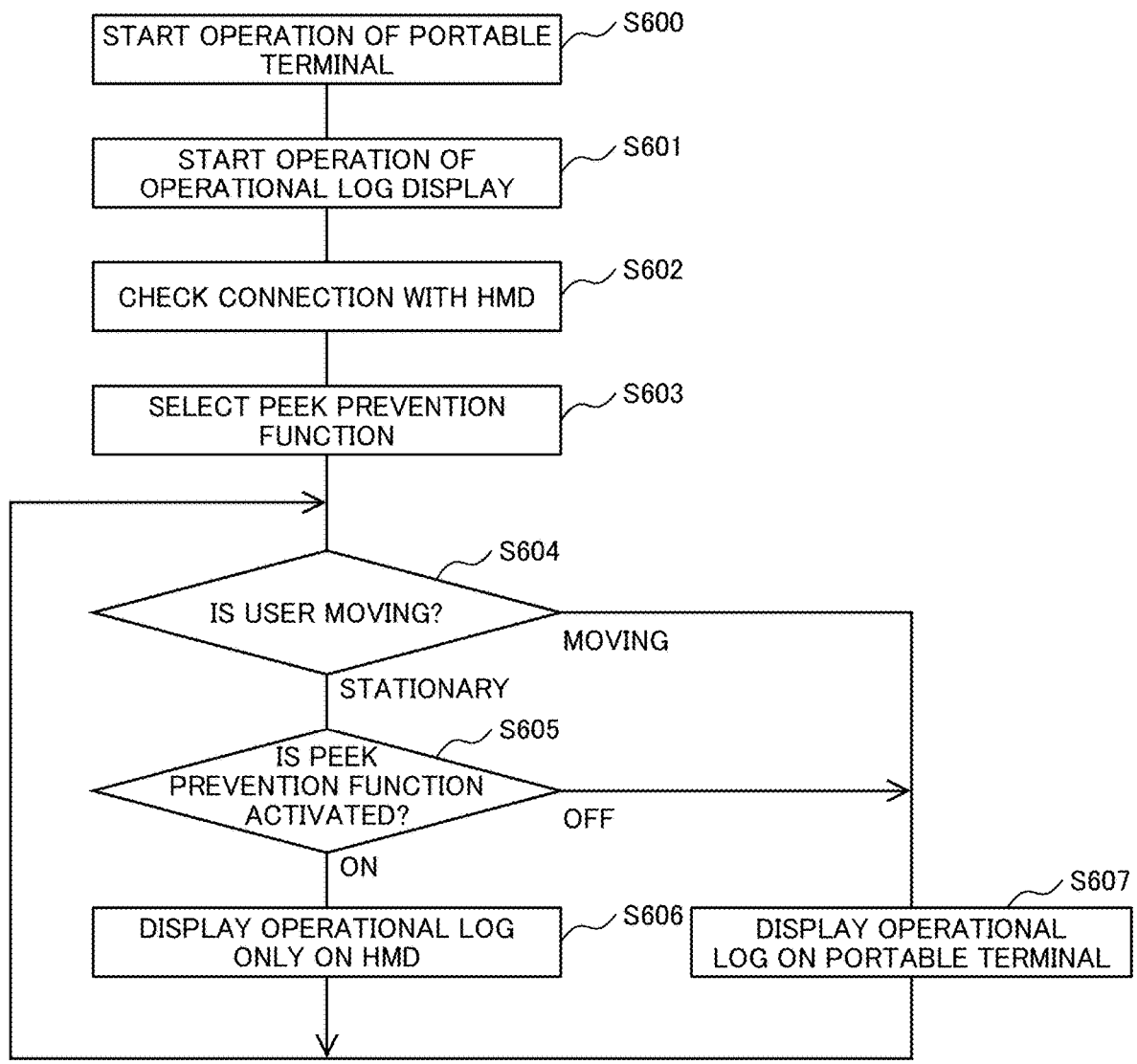
FIG. 22 is a flowchart in a case where the user selectively performs the peek prevention function.

FIG. 22 is a flowchart in a case where the user selectively performs the peek prevention function.

The operation of the portable terminal 1 is started (S600), the operational log app is activated, and the display function of the operational log operated with respect to the portable terminal 1 is executed (S601). The connection check between the portable terminal 1 and the HMD 2 is performed (S602).

The user selects the setting (ON/OFF) of the "peek prevention function" (S603). Whether the user is moving or stationary is determined by the sensor 21 (acceleration sensor) of the portable terminal 1 (S604). When the user is moving, the process proceeds to S607.

When the user is stationary in S604, the user determines a setting state of the "peek prevention function" of the portable terminal 1 (S605). When the "peek prevention function" is not set (S605, Off), the process proceeds to S607.

When the "peek prevention function" is set (S605, On), the display of the operational log on the portable terminal 1 is stopped, and the operational log is displayed only on the HMD 2 (S606). In addition, even in a case where the operation (selection) of displaying the detailed information is further performed on the information of the operational log displayed on the HMD 2, the detailed information is displayed only on the HMD 2.

In S607, the user is moving, the people around the user have a low possibility of peeking, and the user does not select the peek prevention function, and thus, the operational log is directly displayed on the portable terminal 1 or is displayed by using both of the portable terminal 1 and the HMD 2.

After that, returning to S604, whether the user is moving is determined again, and the display is switched. As described above, the display only on the HMD 2 continues until there is no possibility of peeking.

Note that, it is obvious that the peek prevention function as described above is not limited to the case of displaying the operational log, and can be applied to the case of displaying various information pieces.

According to Example 3, in the cooperative display between the portable terminal and the HMD, the information desired not to be seen by the other people is displayed only on the HMD, and thus, there is an effect of protecting the privacy of the user without the people around the portable terminal peeking at the information.

REFERENCE SIGNS LIST

1 Portable terminal
2 Head mounted display (HMD)
10, 30 Display
11, 31 Display controller
12, 32 CPU (main controller)
14 Data storage memory
16, 36 External equipment IF (interface)
17, 37 Touch sensor
20, 40 Camera
21, 41 Various sensors

The invention claimed is:

1. A cooperative display system that connects a portable terminal and a head mounted display to display information by cooperation between the portable terminal and the head mounted display,
wherein the portable terminal displays information on a first display, and transmits at least a part of the information that is displayed to the head mounted display,
wherein the head mounted display shares and displays the information transmitted from the portable terminal on a second display,
wherein whether a user is stationary or moving is detected by a sensor of the portable terminal, and
wherein, when the user is stationary, the display of the information on the first display of the portable terminal is stopped, and the information is displayed only on the second display of the head mounted display.

2. The cooperative display system according to claim 1, wherein the information displayed on the portable terminal is hierarchical information, and
wherein the information displayed on the head mounted display is lower-level information in the hierarchical information.

3. The cooperative display system according to claim 1, wherein the information displayed on the head mounted display is additional information with respect to the information displayed on the portable terminal.

4. The cooperative display system according to claim 1, wherein the portable terminal includes a touch sensor detecting a touch operation of a user with respect to the first display on which the information is displayed, and
wherein the information displayed on the head mounted display is detailed information of an item selected by the user, which is detected by the touch sensor.

5. The cooperative display system according to claim 1,
wherein the portable terminal includes a first camera detecting a visual line direction of a user with respect to the first display on which the information is displayed, and
the information displayed on the head mounted display is detailed information of an item in the visual line direction of the user, which is detected by the first camera.

6. The cooperative display system according to claim 1,
wherein the head mounted display includes a second camera detecting a visual line direction of a user with respect to the first display of the portable terminal on which the information is displayed, and
the information displayed on the head mounted display is detailed information of an item in the visual line direction of the user, which is detected by the second camera.

7. The cooperative display system according to claim 1,
wherein the portable terminal includes a memory storing the information displayed on the first display, a first controller controlling the display of the first display, and a first external equipment interface performing transmission and reception of information with respect to the head mounted display, and
wherein the head mounted display includes a second controller controlling the display of the second display, and a second external equipment interface performing transmission and reception of information with respect to the portable terminal.

8. A cooperative display system that connects a portable terminal and a head mounted display to display information by cooperation between the portable terminal and the head mounted display,
wherein the portable terminal displays information on a first display, and transmits at least a part of the information that is displayed to the head mounted display,
the head mounted display shares and displays the information transmitted from the portable terminal on a second display,
wherein whether a user is stationary or moving is detected by a sensor of the portable terminal,
wherein an image around the user is captured by a first camera of the portable terminal or a second camera of the head mounted display, and
wherein, when the user is stationary and there are other people around the user in a camera image, the display of the information on the first display of the portable terminal is stopped, and the information is displayed only on the second display of the head mounted display.

9. The cooperative display system according to claim 8,
wherein the information displayed on the portable terminal is hierarchical information, and
wherein the information displayed on the head mounted display is lower-level information in the hierarchical information.

10. The cooperative display system according to claim 8,
wherein the information displayed on the head mounted display is additional information with respect to the information displayed on the portable terminal.

11. The cooperative display system according to claim 8,
wherein the portable terminal includes a touch sensor detecting a touch operation of a user with respect to the first display on which the information is displayed, and
wherein the information displayed on the head mounted display is detailed information of an item selected by the user, which is detected by the touch sensor.

12. The cooperative display system according to claim 8,
wherein the portable terminal includes a first camera detecting a visual line direction of a user with respect to the first display on which the information is displayed, and
wherein the information displayed on the head mounted display is detailed information of an item in the visual line direction of the user, which is detected by the first camera.

13. The cooperative display system according to claim 8,
wherein the head mounted display includes a second camera detecting a visual line direction of a user with respect to the first display of the portable terminal on which the information is displayed, and
wherein the information displayed on the head mounted display is detailed information of an item in the visual line direction of the user, which is detected by the second camera.

14. The cooperative display system according to claim 8,
wherein the portable terminal includes a memory storing the information displayed on the first display, a first controller controlling the display of the first display, and a first external equipment interface performing transmission and reception of information with respect to the head mounted display, and
wherein the head mounted display includes a second controller controlling the display of the second display, and a second external equipment interface performing transmission and reception of information with respect to the portable terminal.

* * * * *